(12) United States Patent
Molesini et al.

(10) Patent No.: US 12,416,265 B2
(45) Date of Patent: *Sep. 16, 2025

(54) GEARBOX EFFICIENCY RATING FOR TURBOMACHINE ENGINES

(71) Applicant: GE Avio S.r.l., Turin (IT)

(72) Inventors: Pietro Molesini, Turin (IT); Andrea Piazza, Turin (IT); Fabio De Bellis, Turin (IT)

(73) Assignee: GE Avio S.R.L. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,760

(22) Filed: Oct. 11, 2023

(65) Prior Publication Data

US 2024/0044292 A1 Feb. 8, 2024

Related U.S. Application Data

(63) Continuation of application No. 18/167,751, filed on Feb. 10, 2023, now Pat. No. 11,802,516, which is a (Continued)

(30) Foreign Application Priority Data

Aug. 4, 2020 (IT) ................ 102020000019171

(51) Int. Cl.
*F02C 7/36* (2006.01)
*F01D 25/18* (2006.01)

(52) U.S. Cl.
CPC ............... *F02C 7/36* (2013.01); *F01D 25/18* (2013.01); *F05D 2220/32* (2013.01); *F05D 2260/40311* (2013.01); *F05D 2260/98* (2013.01)

(58) Field of Classification Search
CPC ... F02C 7/36; F05D 2260/40311; F01D 25/18
See application file for complete search history.

(56) References Cited

U.S. PATENT DOCUMENTS 10,626,490 B2   4/2020   Heuer et al.
10,634,233 B1   4/2020   Smith
(Continued)

FOREIGN PATENT DOCUMENTS

CN   105177492 A   12/2015
CN   105697730 A   6/2016
(Continued)

OTHER PUBLICATIONS

Large, J. Investigation of Micro Gas Turbine Systems for High Speed Long Loiter Tactical Unmanned Air Systems. Aerospace 2019 , 6, 55; doi:10.3390/aerospace6050055 (Year: 2019).*
(Continued)

*Primary Examiner* — Topaz L. Elliott
(74) *Attorney, Agent, or Firm* — Klarquist Sparkman, LLP

(57) ABSTRACT

A turbomachine engine can include a fan assembly, a vane assembly, a core engine, and a gearbox. The fan assembly can include a plurality of fan blades. The vane assembly can include a plurality of vanes, and the vanes can, in some instances, be disposed aft of the fan blades. The core engine can include one or more compressor sections and one or more turbine sections. The gearbox includes an input and an output. The input is coupled to the one or more turbine sections of the core engine and comprises a first rotational speed, the output is coupled to the fan assembly and has a second rotational speed. A gear ratio of the first rotational speed to the second rotational speed is within a range of (Continued)

4.1-11.0, and a gearbox oil flow rate at an inlet of the gearbox within a range of 5-25 gallons per minute at a max takeoff condition.

20 Claims, 14 Drawing Sheets

Related U.S. Application Data continuation of application No. 17/837,771, filed on Jun. 10, 2022, now Pat. No. 11,578,666, which is a continuation of application No. 17/344,736, filed on Jun. 10, 2021, now Pat. No. 11,365,688.

(56) References Cited

U.S. PATENT DOCUMENTS

| | | | |
|---|---|---|---|
| 10,641,182 B1 | 5/2020 | Bemment | |
| 10,844,721 B2 | 11/2020 | Townes et al. | |
| 2011/0056183 A1 | 3/2011 | Sankrithi et al. | |
| 2012/0288358 A1 | 11/2012 | Balk | |
| 2013/0192200 A1 | 8/2013 | Kupratis et al. | |
| 2014/0096534 A1* | 4/2014 | Snape | F02C 6/08 60/785 |
| 2014/0140824 A1 | 5/2014 | Sheridan | |
| 2014/0161591 A1 | 6/2014 | Venter | |
| 2014/0227084 A1 | 8/2014 | Sheridan | |
| 2014/0283500 A1 | 9/2014 | Sabnis | |
| 2015/0361878 A1 | 12/2015 | Schwarz et al. | |
| 2015/0377124 A1 | 12/2015 | Adams et al. | |
| 2016/0208651 A1 | 7/2016 | Dolman et al. | |
| 2016/0215729 A1 | 7/2016 | Sabnis | |
| 2017/0108113 A1 | 4/2017 | Hasting et al. | |
| 2017/0175675 A1 | 6/2017 | Sabnis | |
| 2018/0080472 A1* | 3/2018 | Fessenden | F04D 29/324 |
| 2018/0135557 A1 | 5/2018 | Pouyau et al. | |
| 2018/0223732 A1 | 8/2018 | Clements et al. | |
| 2018/0238186 A1 | 8/2018 | Miller et al. | |
| 2018/0252166 A1 | 9/2018 | Pointon | |
| 2018/0259005 A1 | 9/2018 | Nikola et al. | |
| 2018/0291819 A1 | 10/2018 | Sheridan | |
| 2018/0363123 A1 | 12/2018 | Lapierre et al. | |
| 2019/0170240 A1 | 6/2019 | Charrier et al. | |
| 2019/0360578 A1 | 11/2019 | Chevillot et al. | |
| 2020/0003122 A1* | 1/2020 | Wilshaw | F02C 7/20 |
| 2020/0132186 A1 | 4/2020 | Dombek et al. | |
| 2020/0173371 A1 | 6/2020 | Breen | |
| 2020/0240291 A1* | 7/2020 | Sheridan | F02C 7/06 |
| 2020/0277901 A1 | 9/2020 | Bemment | |
| 2020/0291782 A1 | 9/2020 | Townes et al. | |
| 2021/0108572 A1 | 4/2021 | Khalid et al. | |
| 2021/0164392 A1 | 6/2021 | Harvey | |
| 2021/0310420 A1* | 10/2021 | Spruce | F16H 57/02 |
| 2022/0042461 A1 | 2/2022 | Molesini et al. | |
| 2022/0042462 A1 | 2/2022 | Molesini et al. | |
| 2022/0042463 A1 | 2/2022 | Molesini et al. | |
| 2022/0042464 A1 | 2/2022 | Molesini et al. | |
| 2022/0056811 A1 | 2/2022 | Molesini et al. | |
| 2022/0074352 A1 | 3/2022 | Adams et al. | |
| 2023/0028763 A1 | 1/2023 | Pixton et al. | |

FOREIGN PATENT DOCUMENTS

| | | |
|---|---|---|
| CN | 107013669 A | 8/2017 |
| CN | 110475955 A | 11/2019 |
| CN | 110791728 A | 2/2020 |
| CN | 110869650 A | 3/2020 |
| CN | 111237252 A | 6/2020 |
| DE | 102022133702 A1 | 3/2023 |
| EP | 2 360 391 A1 | 8/2011 |
| EP | 3 372 808 A2 | 9/2018 |
| EP | 3 543 476 A1 | 9/2019 |
| EP | 3 591 191 A1 | 1/2020 |
| EP | 3 670 871 A1 | 6/2020 |
| FR | 2991694 B1 | 8/2015 |
| JP | 2006037979 A | 2/2006 |
| WO | WO 2014/066503 A1 | 5/2014 |
| WO | WO 2014/170566 A1 | 10/2014 |
| WO | WO 2019016491 A1 | 1/2019 |

OTHER PUBLICATIONS

Sutliff. DGEN380 Aero-propulsion Research Turbofan (DART)—Status Update (Year: 2023).*

Anderson et al., "Advanced Gearbox Technology Final Report," Allison Gas Turbine Division, General Motors Corporation, NASA CR-179625 (Aug. 1984-Jan. 1987) (156 pages).

Hart, K. Basic Architecture and Sizing of Commercial Aircraft Gas Turbine Oil Feed Systems. Proceedings of ASME Turbo Expo 2008. Jun. 9-13, 2008. (Year: 2008).

Hendricks et al., "Performance and Weight Estimates for an advanced Open Rotor Engine," Prepared for the 48th Joint Propulsion Conf and Exhibit cosponsored by the AIAA, ASME, SAE and ASEE, Atlanta, GA, NASA/TM-2012-217710, AIAA-2012-3911 (Sep. 2012) (20 pages).

Machine Design. Spur versus planetary gearheads for dc servomotors. Accessed from https://www.machinedesign.com/archive/article/21813332/spur-versus-planetary-gearheads-for-dc-servomotors (Year: 2000).

Max Power. Know Which Gear is More Efficient. accessed from http://maxpowergears.com/know-gear-efficient/ (Year: 2017).

* cited by examiner

| Engine | Gear Ratio | Oil Flow (gpm) | Fan Diameter (in.) | Net Thrust (lbf) | Gearbox Efficiency Rating |
|---|---|---|---|---|---|
| Engine 1 | 10.5 | 20.9 | 188.6 | 25503 | 1.02 |
| Engine 2 | 7 | 10.1 | 188.6 | 25000 | 0.51 |
| Engine 3 | 7 | 6 | 142.8 | 12500 | 0.42 |
| Engine 4 | 7 | 8.1 | 188.4 | 25000 | 0.41 |
| Engine 5 | 5.1 | 17 | 120 | 25000 | 0.29 |
| Engine 6 | 4.1 | 12.3 | 120 | 25000 | 0.21 |
| Engine 7 | 4.83 | 18.05 | 120 | 25500 | 0.30 |
| Engine 8 | 4.97 | 19.69 | 120 | 25500 | 0.33 |
| Engine 9 | 4.76 | 17.88 | 120 | 25500 | 0.30 |
| Engine 10 | 5.24 | 19.44 | 120 | 25500 | 0.32 |
| Engine 11 | 5.36 | 18.43 | 120 | 25500 | 0.31 |
| Engine 12 | 12.7 | 35.36 | 156 | 25500 | 1.10 |
| Engine 13 | 7.96 | 14.06 | 156 | 25500 | 0.44 |
| Engine 14 | 8.91 | 12.9 | 156 | 25500 | 0.40 |
| Engine 15 | 8.16 | 12.9 | 156 | 25500 | 0.40 |
| Engine 16 | 8.61 | 12.9 | 156 | 25500 | 0.40 |
| Engine 17 | 8.66 | 12.9 | 156 | 25500 | 0.40 |
| Engine 18 | 8.76 | 14.76 | 156 | 25500 | 0.46 |
| Engine 19 | 8.56 | 27.09 | 156 | 25500 | 0.84 |

FIG. 8

GEARBOX EFFICIENCY RATING FOR TURBOMACHINE ENGINES

CROSS-REFERENCE TO RELATED APPLICATIONS

This application is a continuation of U.S. patent application Ser. No. 18/167,751, filed Feb. 10, 2023, which is a continuation of U.S. patent application Ser. No. 17/837,771, filed Jun. 10, 2022, now U.S. Pat. No. 11,578,666, which is a continuation of U.S. patent application Ser. No. 17/344,736, filed Jun. 10, 2021, now U.S. Pat. No. 11,365,688, which claims the benefit of Italian Patent Application No. 102020000019171, filed Aug. 4, 2020. The prior applications are incorporated by reference herein in their entirety.

ACKNOWLEDGMENT OF GOVERNMENT SUPPORT

The project leading to this application has received funding from the Clean Sky 2 Joint Undertaking (JU) under grant agreement No. 945541. The JU receives support from the European Union's Horizon 2020 research and innovation programme and the Clean Sky 2 JU members other than the Union.

FIELD

This disclosure relates generally to turbomachines including gearbox assemblies and, in particular, to apparatus and methods of determining gear assembly arrangements particular to certain turbomachine configurations.

BACKGROUND

A turbofan engine includes a core engine that drives a bypass fan. The bypass fan generates the majority of the thrust of the turbofan engine. The generated thrust can be used to move a payload (e.g., an aircraft).

In some instances, a turbofan engine is configured as a direct drive engine. Direct drive engines are configured such that a power turbine (e.g., a low-pressure turbine) of the core engine is directly coupled to the bypass fan. As such, the power turbine and the bypass fan rotate at the same rotational speed (i.e., the same rpm).

In other instances, a turbofan engine can be configured as a geared engine. Geared engines include a gearbox disposed between and interconnecting the bypass fan and power turbine of the core engine. The gearbox, for example, allows the power turbine of the core engine to rotate at a different speed than the bypass fan. Thus, the gearbox can, for example, allow the power turbine of the core engine and the bypass fan to operate at their respective rotational speeds for maximum efficiency and/or power production.

Despite certain advantages, geared turbofan engines can have one or more drawbacks. For example, including a gearbox in a turbofan engine introduces additional complexity to the engine. This can, for example, make engine development and/or manufacturing significantly more difficult. As such, there is a need for improved geared turbofan engines. There is also a need for devices and methods that can be used to develop and manufacture geared turbofan engines more efficiently and/or precisely.

BRIEF DESCRIPTION

Aspects and advantages of the disclosed technology will be set forth in part in the following description, or may be obvious from the description, or may be learned through practice of the technology disclosed in the description.

Various turbomachine engines and gear assemblies are disclosed herein. The disclosed turbomachine engines comprise a gearbox. And the disclosed turbomachine engines are characterized or defined by a gearbox efficiency rating. The gearbox efficiency rating (GER) equals $$Q\left(\frac{D^{1.56}}{T}\right)^{1.53},$$

where Q is a gearbox oil flow rate an inlet of the gearbox measured in gallons per minute at a max takeoff condition, D is a diameter of the fan blades measured in inches, and T is a net thrust of the turbomachine engine measured in pounds force at the max takeoff condition. The gearbox efficiency rating may also be used, for example, to aid the development of the gearbox in relation to other engine parameters. The gearbox efficiency rating thus provides improved turbomachine engines and/or can help simplify one or more complexities of geared turbomachine engine development.

In particular embodiments, a turbomachine engine includes a fan assembly, a vane assembly, a core engine, a gearbox, and a gearbox efficiency rating. The fan assembly includes a plurality of fan blades. The vane assembly includes a plurality of vanes. The core engine includes one or more compressor sections and one or more turbine sections. The gearbox includes an input and an output. The input is coupled to the one or more turbine sections of the core engine and comprises a first rotational speed, the output is coupled to the fan assembly and has a second rotational speed, and a gear ratio of the first rotational speed to the second rotational speed is within a range of 4.1-14.0. The gearbox efficiency rating is 0.10-1.8.

These and other features, aspects, and/or advantages of the present disclosure will become better understood with reference to the following description and the claims. The accompanying drawings, which are incorporated in and constitute a part of this specification, illustrate embodiments of the disclosed technology and, together with the description, serve to explain the principles of the disclosure.

BRIEF DESCRIPTION OF THE DRAWINGS

FIG. 8 is a chart depicting various engine parameters of several exemplary turbomachine engines.

DETAILED DESCRIPTION

Figure 1:
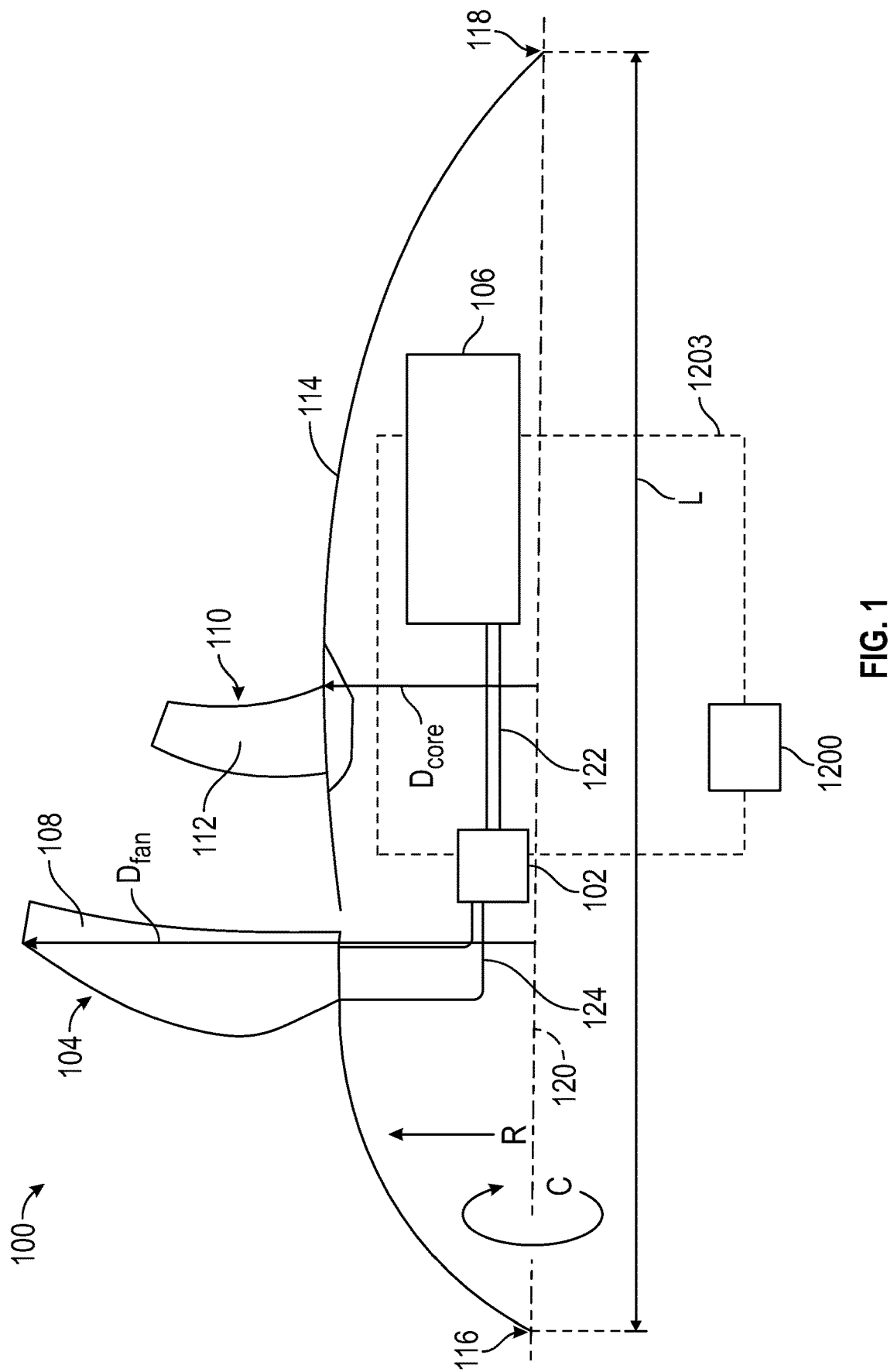
FIG. 1 is a cross-sectional schematic illustration of an exemplary embodiment of a turbomachine engine configured with an open rotor propulsion system.

Reference now will be made in detail to embodiments of the disclosed technology, one or more examples of which are illustrated in the drawings. Each example is provided by way of explanation of the disclosed technology, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108. A vane assembly 110 extends from the outer casing 114 in a cantilevered manner. Thus, the vane assembly 110 can also be referred to as an unducted vane assembly. The vane assembly 110, including a plurality of vanes 112, is positioned in operable arrangement with the fan blades 108 to provide thrust, control thrust vector, abate or re-direct undesired acoustic noise, and/or otherwise desirably alter a flow of air relative to the fan blades 108.

In some embodiments, the fan assembly 104 includes eight (8) to twenty (20) fan blades 108. In particular embodiments, the fan assembly 104 includes ten (10) to eighteen (18) fan blades 108. In certain embodiments, the fan assembly 104 includes twelve (12) to sixteen (16) fan blades 108.

In some embodiments, the vane assembly 110 includes three (3) to thirty (30) vanes 112. In certain embodiments, the vane assembly 110 includes an equal or fewer quantity of vanes 112 to fan blades 108. For example, in particular embodiments, the engine 100 includes twelve (12) fan blades 108 and ten (10) vanes 112. In other embodiments, the vane assembly 110 includes a greater quantity of vanes 112 to fan blades 108. For example, in particular embodiments, the engine 100 includes ten (10) fan blades 108 and twenty-three (23) vanes 112.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned only aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is an unducted rotor engine with a single row of fan blades 108. The fan blades 108 can have a large diameter, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds.

The fan blades 108 comprise a diameter ($D_{fan}$). It should be noted that for purposes of illustration only half of the $D_{fan}$ is shown (i.e., the radius of the fan). In some embodiments, the $D_{fan}$ is 72-216 inches. In particular embodiments the $D_{fan}$ is 100-200 inches. In certain embodiments, the $D_{fan}$ is 120-190 inches. In other embodiments, the $D_{fan}$ is 72-120 inches. In yet other embodiments, the $D_{fan}$ is 50-80 inches.

In some embodiments, the fan blade tip speed at a cruise flight condition can be 650 to 900 fps, or 700 to 800 fps. A fan pressure ratio (FPR) for the fan assembly 104 can be 1.04 to 1.10, or in some embodiments 1.05 to 1.08, as measured across the fan blades at a cruise flight condition.

Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft. In still certain embodiments, cruise altitude is expressed in flight levels (FL) based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea-level pressure of approximately 14.70 psia and sea-level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea-level pressure and/or sea-level temperature.

The core engine 106 is generally encased in outer casing 114 defining one half of a core diameter ($D_{core}$), which may be thought of as the maximum extent from the centerline axis (datum for R). In certain embodiments, the engine 100 includes a length (L) from a longitudinally (or axial) forward end 116 to a longitudinally aft end 118. In various embodiments, the engine 100 defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3. In various embodiments, it should be appreciated that the $L/D_{core}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{core}$, the fan assembly 104, and/or the vane assembly 110 separately or together configure, at least in part, the engine 100 to operate at a maximum cruise altitude operating speed between approximately Mach 0.55 and approximately Mach 0.85; or between approximately 0.72 to 0.85 or between approximately 0.75 to 0.85.

Referring still to FIG. 1, the core engine 106 extends in a radial direction (R) relative to an engine centerline axis 120. The gear assembly 102 receives power or torque from the core engine 106 through a power input source 122 and provides power or torque to drive the fan assembly 104, in a circumferential direction C about the engine centerline axis 120, through a power output source 124.

The gear assembly 102 of the engine 100 can include a plurality of gears, including an input and an output. The gear assembly can also include one or more intermediate gears disposed between and/or interconnecting the input and the output. The input can be coupled to a turbine section of the core engine 106 and can comprise a first rotational speed. The output can be coupled to the fan assembly and can have a second rotational speed. In some embodiments, a gear ratio of the first rotational speed to the second rotational speed is greater than 4.1 (e.g., within a range of 4.1-14.0).

The gear assembly 102 (which can also be referred to as "a gearbox") can comprise various types and/or configuration. For example, in some embodiments, the gearbox is an epicyclic gearbox configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine.

The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Figure 9:
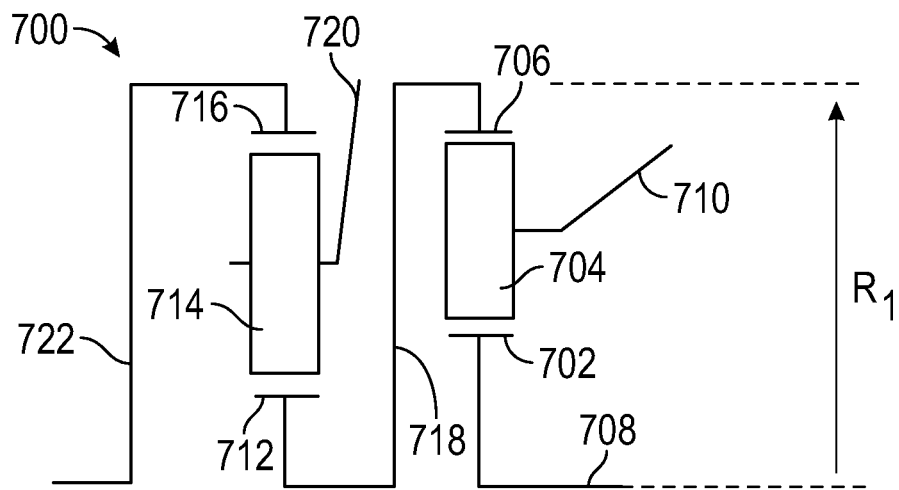
FIG. 9 is a cross-sectional schematic illustration of an exemplary embodiment of a gearbox configuration for a turbomachine engine.
Figure 10:
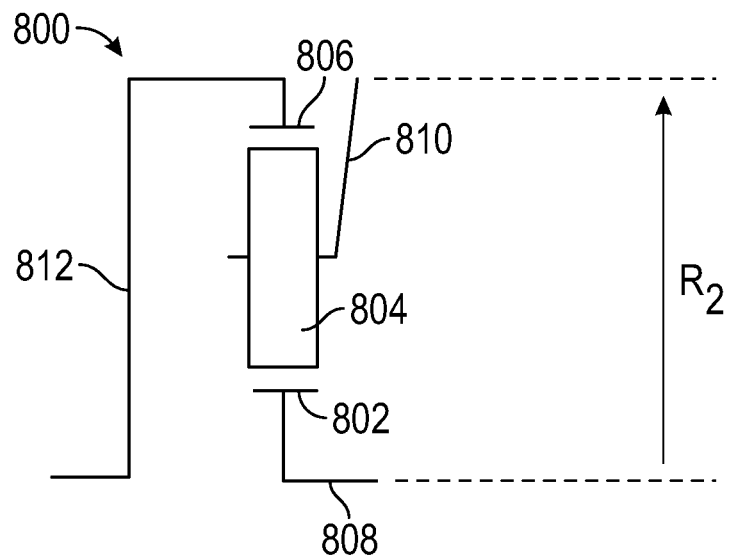
FIG. 10 is a cross-sectional schematic illustration of an exemplary embodiment of a gearbox configuration for a turbomachine engine.
Figure 11:
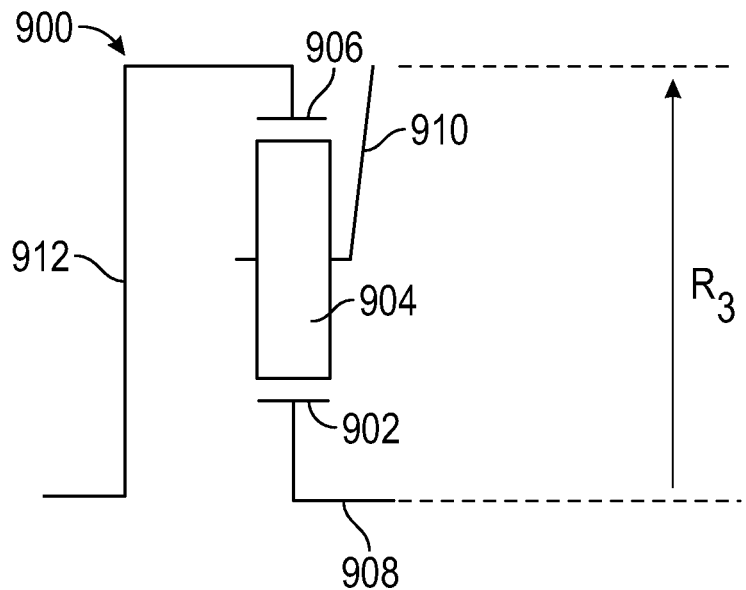
FIG. 11 is a cross-sectional schematic illustration of an exemplary embodiment of a gearbox configuration for a turbomachine engine.

In some embodiments, the gearbox is a single-stage gearbox (e.g., FIGS. 10-11). In other embodiments, the gearbox is a multi-stage gearbox (e.g., FIGS. 9 and 12). In some embodiments, the gearbox is an epicyclic gearbox. In some embodiments, the gearbox is a non-epicyclic gearbox (e.g., a compound gearbox—FIG. 13).

As noted above, the gear assembly can be used to reduce the rotational speed of the output relative to the input. In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 2,500-15,000 rpm at a cruise flight condition. In particular embodiments, the fan assembly can be configured to rotate at a rotational speed of 850-1350 rpm at a cruise flight condition, while the power turbine is configured to rotate at a rotational speed of 5,000-10,000 rpm at a cruise flight condition.

Various gear assembly configurations are depicted schematically in FIGS. 9-13. These gearboxes can be used any of the engines disclosed herein, including the engine 100. Additional details regarding the gearboxes are provided below.

Figure 2:
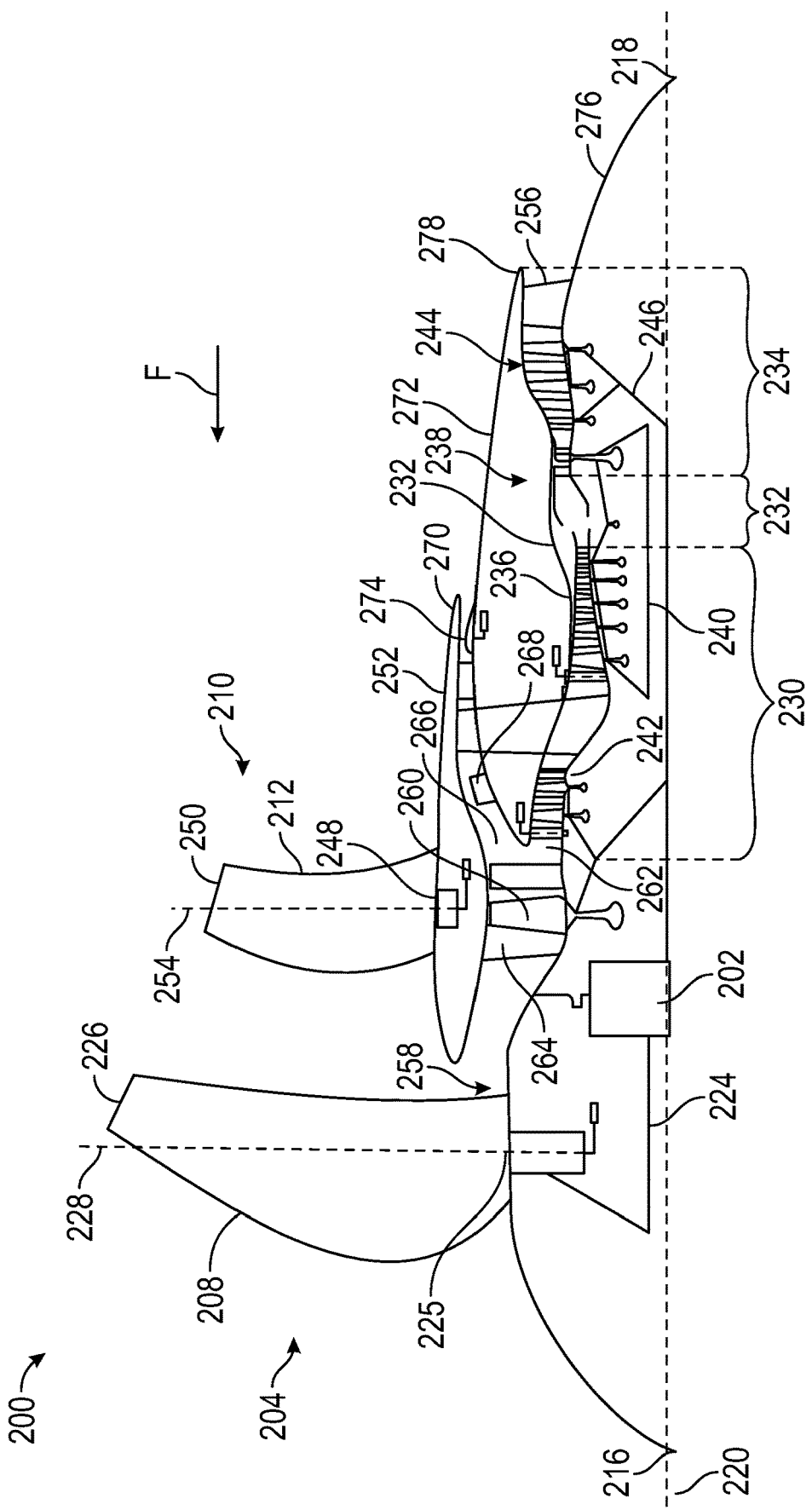
FIG. 2 is a cross-sectional schematic illustration of an exemplary embodiment of a turbomachine engine configured with an open rotor propulsion system.

FIG. 2 shows a cross-sectional view of an engine 200, which is configured as an exemplary embodiment of an open rotor propulsion engine. The engine 200 is generally similar to the engine 100 and corresponding components have been numbered similarly. For example, the gear assembly of the engine 100 is numbered "102" and the gear assembly of the engine 200 is numbered "202," and so forth. In addition to the gear assembly 202, the engine 200 comprises a fan assembly 204 that includes a plurality of fan blades 208 distributed around the engine centerline axis 220. Fan blades 208 are circumferentially arranged in an equally spaced relation around the engine centerline axis 220, and each fan blade 208 has a root 225 and a tip 226, and an axial span defined therebetween, as well as a central blade axis 228.

The core engine 206 includes a compressor section 230, a combustion section 232, and a turbine section 234 (which may be referred to as "an expansion section") together in a serial flow arrangement. The core engine 206 extends circumferentially relative to an engine centerline axis 220. The core engine 206 includes a high-speed spool that includes a high-speed compressor 236 and a high-speed turbine 238 operably rotatably coupled together by a high-speed shaft 240. The combustion section 232 is positioned between the high-speed compressor 236 and the high-speed turbine 238.

The combustion section 232 may be configured as a deflagrative combustion section, a rotating detonation combustion section, a pulse detonation combustion section, and/or other appropriate heat addition system. The combustion section 232 may be configured as one or more of a rich-burn system or a lean-burn system, or combinations thereof. In still various embodiments, the combustion section 232 includes an annular combustor, a can combustor, a cannular combustor, a trapped vortex combustor (TVC), or other appropriate combustion system, or combinations thereof.

The core engine 206 also includes a booster or low-pressure compressor positioned in flow relationship with the high-pressure compressor 236. The low-pressure compressor 242 is rotatably coupled with the low-pressure turbine 244 via a low-speed shaft 246 to enable the low-pressure turbine 244 to drive the low-pressure compressor 242. The low-speed shaft 246 is also operably connected to the gear assembly 202 to provide power to the fan assembly 204, such as described further herein.

It should be appreciated that the terms "low" and "high," or their respective comparative degrees (e.g., "lower" and "higher", where applicable), when used with compressor, turbine, shaft, or spool components, each refer to relative pressures and/or relative speeds within an engine unless otherwise specified. For example, a "low spool" or "low-speed shaft" defines a component configured to operate at a rotational speed, such as a maximum allowable rotational speed, lower than a "high spool" or "high-speed shaft" of the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

The compressors and/or turbines disclosed herein can include various stage counts. As disclosed herein the stage count includes the number of rotors or blade stages in a particular component (e.g., a compressor or turbine). For example, in some embodiments, a low-pressure compressor can comprise 1-8 stages, a high-pressure compressor can comprise 8-15 stages, a high-pressure turbine comprises 1-2 stages, and/or a low-pressure turbine comprises 3-7 stages. For example, in certain embodiments, an engine can comprise a one stage low-pressure compressor, an 11 stage high-pressure compressor, a two stage high-pressure compressor, and a 7 stage low-pressure turbine. As another example, an engine can comprise a three stage low-pressure compressor, a 10 stage high-pressure compressor, a two stage high-pressure compressor, and a 7 stage low-pressure turbine.

In some embodiments, a low-pressure turbine is a counter-rotating low-pressure turbine comprising inner blade stages and outer blade stages. The inner blade stages extend radially outwardly from an inner shaft, and the outer blade stages extend radially inwardly from an outer drum. In particular embodiments, the counter-rotating low-pressure turbine comprises three inner blade stages and three outer blade stages, which can collectively be referred to as a six stage low-pressure turbine. In other embodiments, the counter-rotating low-pressure turbine comprises four inner blade stages and three outer blade stages, which can be collectively be referred to as a seven stage low-pressure turbine.

As discussed in more detail below, the core engine 206 includes the gear assembly 202 that is configured to transfer power from the turbine section 234 and reduce an output rotational speed at the fan assembly 204 relative to the low-speed turbine 244. Embodiments of the gear assembly 202 depicted and described herein can allow for gear ratios suitable for large-diameter unducted fans (e.g., gear ratios of 4.1-14.0, 4.5-14.0, and/or 6.0-14.0). Additionally, embodiments of the gear assembly 202 provided herein may be suitable within the radial or diametrical constraints of the core engine 206 within the outer casing 214.

Various gearbox configurations are depicted schematically in FIGS. 9-13. These gearboxes can be used in any of the engines disclosed herein, including the engine 200. Additional details regarding the gearboxes are provided below.

Engine 200 also includes a vane assembly 210 comprising a plurality of vanes 212 disposed around engine centerline axis 220. Each vane 212 has a root 248 and a tip 250, and a span defined therebetween. Vanes 212 can be arranged in a variety of manners. In some embodiments, for example, they are not all equidistant from the rotating assembly.

In some embodiments, vanes 212 are mounted to a stationary frame and do not rotate relative to the engine centerline axis 220, but may include a mechanism for adjusting their orientation relative to their axis 254 and/or relative to the fan blades 208. For reference purposes, FIG. 2 depicts a forward direction denoted with arrow F, which in turn defines the forward and aft portions of the system.

As depicted in FIG. 2, the fan assembly 204 is located forward of the core engine 106 with the exhaust 256 located aft of core engine 206 in a "puller" configuration. Other configurations are possible and contemplated as within the scope of the present disclosure, such as what may be termed a "pusher" configuration embodiment where the engine core is located forward of the fan assembly. The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Left- or right-handed engine configurations, useful for certain installations in reducing the impact of multi-engine torque upon an aircraft, can be achieved by mirroring the airfoils (e.g., 208, 212) such that the fan assembly 204 rotates clockwise for one propulsion system and counterclockwise for the other propulsion system. Alternatively, an optional reversing gearbox can be provided to permit a common gas turbine core and low-pressure turbine to be used to rotate the fan blades either clockwise or counterclockwise, i.e., to provide either left- or right-handed configurations, as desired, such as to provide a pair of oppositely-rotating engine assemblies can be provided for certain aircraft installations while eliminating the need to have internal engine parts designed for opposite rotation directions.

The engine 200 also includes the gear assembly 202 which includes a gear set for decreasing the rotational speed of the fan assembly 204 relative to the low-speed turbine 244. In operation, the rotating fan blades 208 are driven by the low-speed turbine 244 via gear assembly 202 such that the fan blades 208 rotate around the engine centerline axis 220 and generate thrust to propel the engine 200, and hence an aircraft on which it is mounted, in the forward direction F.

In some embodiments, a gear ratio of the input rotational speed to the output rotational speed is greater than 4.1. For example, in particular embodiments, the gear ratio is within a range of 4.1-14.0, within a range of 4.5-14.0, or within a range of 6.0-14.0. In certain embodiments, the gear ratio is within a range of 4.5-12 or within a range of 6.0-11.0. As such, in some embodiments, the fan assembly can be configured to rotate at a rotational speed of 700-1500 rpm at a cruise flight condition, while the power turbine (e.g., the low-pressure turbine) is configured to rotate at a rotational speed of 5,000-10,000 rpm at a cruise flight condition. In particular embodiments, the fan assembly can be configured to rotate at a rotational speed of 850-1350 rpm at a cruise flight condition, while the power turbine is configured to rotate at a rotational speed of 5,500-9,500 rpm a cruise flight condition.

It may be desirable that either or both of the fan blades 208 or the vanes 212 to incorporate a pitch change mechanism such that the blades can be rotated with respect to an axis of pitch rotation (annotated as 228 and 254, respectively) either independently or in conjunction with one another. Such pitch change can be utilized to vary thrust and/or swirl effects under various operating conditions, including to provide a thrust reversing feature which may be useful in certain operating conditions such as upon landing an aircraft.

Vanes 212 can be sized, shaped, and configured to impart a counteracting swirl to the fluid so that in a downstream direction aft of both fan blades 208 and vanes 212 the fluid has a greatly reduced degree of swirl, which translates to an increased level of induced efficiency. Vanes 212 may have a shorter span than fan blades 208, as shown in FIG. 2. For example, vanes 212 may have a span that is at least 50% of a span of fan blades 208. In some embodiments, the span of the vanes can be the same or longer than the span as fan blades 208, if desired. Vanes 212 may be attached to an aircraft structure associated with the engine 200, as shown in FIG. 2, or another aircraft structure such as a wing, pylon, or fuselage. Vanes 212 may be fewer or greater in number than, or the same in number as, the number of fan blades 208. In some embodiments, the number of vanes 212 are greater than two, or greater than four, in number. Fan blades 208 may be sized, shaped, and contoured with the desired blade loading in mind.

In the embodiment shown in FIG. 2, an annular 360-degree inlet 258 is located between the fan assembly 204 and the vane assembly 210, and provides a path for incoming atmospheric air to enter the core engine 206 radially inwardly of at least a portion of the vane assembly 210. Such a location may be advantageous for a variety of reasons, including management of icing performance as well as protecting the inlet 258 from various objects and materials as may be encountered in operation.

In the exemplary embodiment of FIG. 2, in addition to the open rotor or unducted fan assembly 204 with its plurality of fan blades 208, an optional ducted fan assembly 260 is included behind fan assembly 204, such that the engine 200 includes both a ducted and an unducted fan which both serve to generate thrust through the movement of air at atmospheric temperature without passage through the core engine 206. The ducted fan assembly 260 is shown at about the same axial location as the vane 212, and radially inward of the root 248 of the vane 212. Alternatively, the ducted fan assembly 260 may be between the vane 212 and core duct 262, or be farther forward of the vane 212. The ducted fan assembly 260 may be driven by the low-pressure turbine 244, or by any other suitable source of rotation, and may serve as the first stage of the low-pressure compressor 242 or may be operated separately. Air entering the inlet 258 flows through an inlet duct 264 and then is divided such that a portion flows through a core duct 262 and a portion flows through a fan duct 266. Fan duct 266 may incorporate heat exchangers 268 and exhausts to the atmosphere through an independent fixed or variable nozzle 270 aft of the vane assembly 210, at the aft end of the fan cowl 252 and outside of the engine core cowl 272. Air flowing through the fan duct 266 thus "bypasses" the core of the engine and does not pass through the core.

Thus, in the exemplary embodiment, engine 200 includes an unducted fan formed by the fan blades 208, followed by the ducted fan assembly 260, which directs airflow into two concentric or non-concentric ducts 262 and 266, thereby forming a three-stream engine architecture with three paths for air which passes through the fan assembly 204.

In the exemplary embodiment shown in FIG. 2, a slidable, moveable, and/or translatable plug nozzle 274 with an actuator may be included in order to vary the exit area of the nozzle 270. A plug nozzle is typically an annular, symmetrical device which regulates the open area of an exit such as a fan stream or core stream by axial movement of the nozzle such that the gap between the nozzle surface and a stationary structure, such as adjacent walls of a duct, varies in a scheduled fashion thereby reducing or increasing a space for airflow through the duct. Other suitable nozzle designs may be employed as well, including those incorporating thrust reversing functionality. Such an adjustable, moveable nozzle may be designed to operate in concert with other systems such as VBV's, VSV's, or blade pitch mechanisms and may be designed with failure modes such as fully-open, fully-closed, or intermediate positions, so that the nozzle 270 has a consistent "home" position to which it returns in the event of any system failure, which may prevent commands from reaching the nozzle 270 and/or its actuator.

In some embodiments, a mixing device 276 can be included in a region aft of a core nozzle 278 to aid in mixing the fan stream and the core stream to improve acoustic performance by directing core stream outward and fan stream inward.

Since the engine 200 shown in FIG. 2 includes both an open rotor fan assembly 204 and a ducted fan assembly 260, the thrust output of both and the work split between them can be tailored to achieve specific thrust, fuel burn, thermal management, and/or acoustic signature objectives which may be superior to those of a typical ducted fan gas turbine propulsion assembly of comparable thrust class. The ducted fan assembly 260, by lessening the proportion of the thrust required to be provided by the unducted fan assembly 104, may permit a reduction in the overall fan diameter of the unducted fan assembly and thereby provide for installation flexibility and reduced weight.

Operationally, the engine 200 may include a control system that manages the loading of the respective open and ducted fans, as well as potentially the exit area of the variable fan nozzle, to provide different thrust, noise, cooling capacity and other performance characteristics for various portions of the flight envelope and various operational conditions associated with aircraft operation. For example, in climb mode the ducted fan may operate at maximum pressure ratio there-by maximizing the thrust capability of stream, while in cruise mode, the ducted fan may operate a lower pressure ratio, raising overall efficiency through reliance on thrust from the unducted fan. Nozzle actuation modulates the ducted fan operating line and overall engine fan pressure ratio independent of total engine airflow.

The ducted fan stream flowing through fan duct 266 may include one or more heat exchangers 268 for removing heat from various fluids used in engine operation (such as an air-cooled oil cooler (ACOC), cooled cooling air (CCA), etc.). The heat exchangers 268 may take advantage of the integration into the fan duct 266 with reduced performance penalties (such as fuel efficiency and thrust) compared with traditional ducted fan architectures, due to not impacting the primary source of thrust which is, in this case, the unducted fan stream. Heat exchangers may cool fluids such as gearbox oil, engine sump oil, thermal transport fluids such as supercritical fluids or commercially available single-phase or two-phase fluids (supercritical CO2, EGV, Slither 800, liquid metals, etc.), engine bleed air, etc. Heat exchangers may also be made up of different segments or passages that cool different working fluids, such as an ACOC paired with a fuel cooler. Heat exchangers 268 may be incorporated into a thermal management system which provides for thermal transport via a heat exchange fluid flowing through a network to remove heat from a source and transport it to a heat exchanger.

Since the fan pressure ratio is higher for the ducted fan than for the unducted fan, the fan duct provides an environment where more compact heat exchangers may be utilized than would be possible if installed on the outside of the core cowl in the unducted fan stream. Fan bypass air is at a very low fan pressure ratio (FPR) (1.05 to 1.08), making it difficult to drive air through heat exchangers. Without the availability of a fan duct as described herein, scoops or booster bleed air may be required to provide cooling air to and through heat exchangers. A set of parameters can be developed around heat exchangers in the fan duct, based on heat load, heat exchanger size, ducted fan stream corrected flow, and ducted fan stream temperature.

The fan duct 266 also provides other advantages in terms of reduced nacelle drag, enabling a more aggressive nacelle close-out, improved core stream particle separation, and inclement weather operation. By exhausting the fan duct flow over the core cowl, this aids in energizing the boundary layer and enabling the option of a steeper nacelle close out angle between the maximum dimension of the engine core cowl 272 and the exhaust 256. The close-out angle is normally limited by air flow separation, but boundary layer energization by air from the fan duct 266 exhausting over the core cowl reduces air flow separation. This yields a shorter, lighter structure with less frictional surface drag.

The fan assembly and/or vane assembly can be shrouded or unshrouded (as shown in FIGS. 1 and 2). Although not shown, an optional annular shroud or duct can be coupled to the vane assembly 210 and located distally from the engine centerline axis 220 relative to the vanes 212. In addition to the noise reduction benefit, the duct may provide improved vibratory response and structural integrity of the vanes 212 by coupling them into an assembly forming an annular ring or one or more circumferential sectors, i.e., segments forming portions of an annular ring linking two or more of the vanes 212. The duct may also allow the pitch of the vanes to be varied more easily. For example, FIGS. 3-4, discussed in more detail below, disclose embodiments in which both the fan assembly and vane assembly are shrouded.

Although depicted above as an unshrouded or open rotor engine in the embodiments depicted above, it should be appreciated that aspects of the disclosure provided herein may be applied to shrouded or ducted engines, partially ducted engines, aft-fan engines, or other turbomachine configurations, including those for marine, industrial, or aeropropulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

Figure 3:
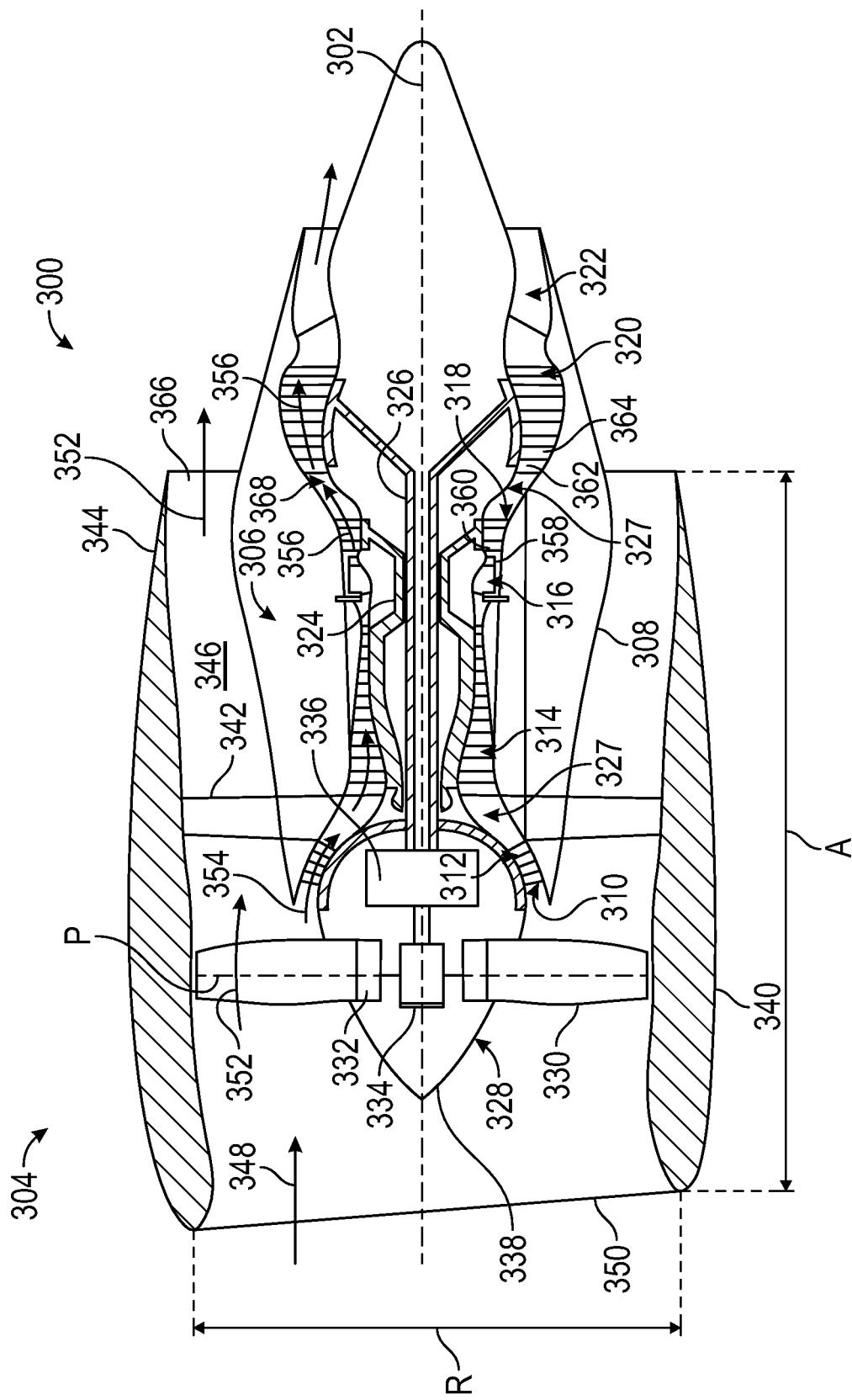
FIG. 3 is a cross-sectional schematic illustration of an exemplary embodiment of a turbomachine engine configured with a ducted propulsion system.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 300, referred to herein as "turbofan engine 300." As shown in FIG. 3, the turbofan engine 300 defines an axial direction A (extending parallel to a longitudinal centerline 302 provided for reference) and a radial direction R (extending perpendicular to the axial direction A). In general, the turbofan 300 includes a fan section 304 and a core engine 306 disposed downstream from the fan section 304. The engine 300 also includes a gear assembly or power gear box 336 having a plurality of gears for coupling a gas turbine shaft to a fan shaft. The position of the power gear box 336 is not limited to that as shown in the exemplary embodiment of turbofan 300. For example, the position of the power gear box 336 may vary along the axial direction A.

The exemplary core engine 306 depicted generally includes a substantially tubular outer casing 308 that defines an annular inlet 310. The outer casing 308 encases, in serial flow relationship, a compressor section including a booster or low-pressure (LP) compressor 312 and a high-pressure (HP) compressor 314; a combustion section 316; a turbine section including a high-pressure (HP) turbine 318 and a low-pressure (LP) turbine 320; and a jet exhaust nozzle section 322. A high-pressure (HP) shaft or spool 324 drivingly connects the HP turbine 318 to the HP compressor 314. A low-pressure (LP) shaft or spool 326 drivingly connects the LP turbine 320 to the LP compressor 312. Additionally, the compressor section, combustion section 316, and turbine section together define at least in part a core air flowpath 327 extending therethrough.

A gear assembly of the present disclosure is compatible with standard fans, variable pitch fans, or other configurations. For the embodiment depicted, the fan section 304 may include a variable pitch fan 328 having a plurality of fan blades 330 coupled to a disk 332 in a spaced apart manner. As depicted, the fan blades 330 extend outwardly from disk 332 generally along the radial direction R. Each fan blade 330 is rotatable relative to the disk 332 about a pitch axis P by virtue of the fan blades 330 being operatively coupled to a suitable actuation member 334 configured to collectively vary the pitch of the fan blades 330. The fan blades 330, disk 332, and actuation member 334 are together rotatable about the longitudinal axis 302 by LP shaft 326 across a gear assembly or power gear box 336. A gear assembly 336 may enable a speed change between a first shaft, e.g., LP shaft 326, and a second shaft, e.g., LP compressor shaft and/or fan shaft. For example, in one embodiment, the gear assembly 336 may be disposed in an arrangement between a first shaft and a second shaft such as to reduce an output speed from one shaft to another shaft.

More generally, the gear assembly 336 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan.

Referring still to the exemplary embodiment of FIG. 3, the disk 332 is covered by rotatable front nacelle 338 aerodynamically contoured to promote an airflow through the plurality of fan blades 330. Additionally, the exemplary fan section 304 includes an annular fan casing or outer nacelle 340 that circumferentially surrounds the fan 328 and/or at least a portion of the core engine 306. The nacelle 340 is, for the embodiment depicted, supported relative to the core engine 306 by a plurality of circumferentially-spaced outlet guide vanes 342. Additionally, a downstream section 344 of the nacelle 340 extends over an outer portion of the core engine 306 so as to define a bypass airflow passage 346 therebetween.

During operation of the turbofan engine 300, a volume of air 348 enters the turbofan 300 through an associated inlet 350 of the nacelle 340 and/or fan section 304. As the volume of air 348 passes across the fan blades 330, a first portion of the air 348 as indicated by arrows 352 is directed or routed into the bypass airflow passage 346 and a second portion of the air 348 as indicated by arrow 354 is directed or routed into the LP compressor 312. The ratio between the first portion of air 352 and the second portion of air 354 is commonly known as a bypass ratio. The pressure of the second portion of air 354 is then increased as it is routed through the high-pressure (HP) compressor 314 and into the combustion section 316, where it is mixed with fuel and burned to provide combustion gases 356.

The combustion gases 356 are routed through the HP turbine 318 where a portion of thermal and/or kinetic energy from the combustion gases 356 is extracted via sequential stages of HP turbine stator vanes 358 that are coupled to the outer casing 308 and HP turbine rotor blades 360 that are coupled to the HP shaft or spool 324, thus causing the HP shaft or spool 324 to rotate, thereby supporting operation of the HP compressor 314. The combustion gases 356 are then routed through the LP turbine 320 where a second portion of thermal and kinetic energy is extracted from the combustion gases 356 via sequential stages of LP turbine stator vanes 362 that are coupled to the outer casing 308 and LP turbine rotor blades 364 that are coupled to the LP shaft or spool 326, thus causing the LP shaft or spool 326 to rotate, thereby supporting operation of the LP compressor 312 and/or rotation of the fan 328.

The combustion gases 356 are subsequently routed through the jet exhaust nozzle section 322 of the core engine 306 to provide propulsive thrust. Simultaneously, the pressure of the first portion of air 352 is substantially increased as the first portion of air 352 is routed through the bypass airflow passage 346 before it is exhausted from a fan nozzle exhaust section 366 of the turbofan 300, also providing propulsive thrust. The HP turbine 318, the LP turbine 320, and the jet exhaust nozzle section 322 at least partially define a hot gas path 368 for routing the combustion gases 356 through the core engine 306.

Figure 4:
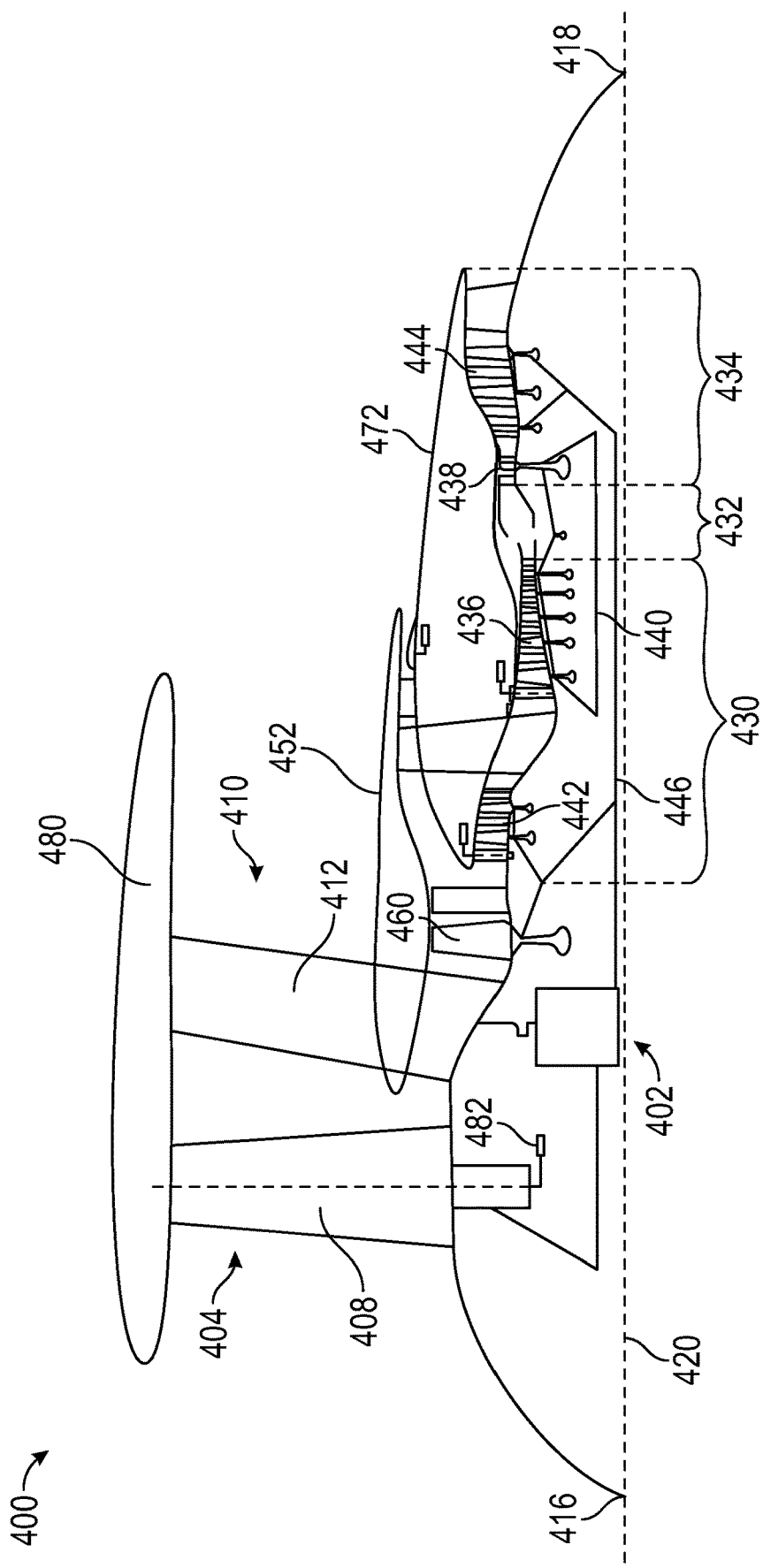
FIG. 4 is a cross-sectional schematic illustration of an exemplary embodiment of a turbomachine engine configured with a ducted propulsion system.

For example, FIG. 4 is a cross-sectional schematic illustration of an exemplary embodiment of an engine 400 that includes a gear assembly 402 in combination with a ducted fan assembly 404 and a core engine 406. However, unlike the open rotor configuration of the engine 200, the fan assembly 404 and its fan blades 408 are contained within an annular fan case 480 (which can also be referred to as "a nacelle") and the vane assembly 410 and the vanes 412 extend radially between the fan cowl 452 (and/or the engine core cowl 472) and the inner surface of the fan case 480. As discussed above, the gear assemblies disclosed herein can provide for increased gear ratios for a fixed gear envelope (e.g., with the same size ring gear), or alternatively, a smaller diameter ring gear may be used to achieve the same gear ratios.

The core engine 400 comprises a compressor section 430, a combustor section 432, and a turbine section 434. The compressor section 430 can include a high-pressure compressor 436 and a booster or a low-pressure compressor 442. The turbine section 434 can include a high-pressure turbine 438 and a low-pressure turbine 444. The low-pressure compressor 442 is positioned forward of and in flow relationship with the high-pressure compressor 436. The low-pressure compressor 442 is rotatably coupled with the low-pressure turbine 444 via a low-speed shaft 446 to enable the low-pressure turbine 444 to drive the low-pressure compressor 442 (and a ducted fan 460). The low-speed shaft 446 is also operably connected to the gear assembly 402 to provide power to the fan assembly 404. The high-pressure compressor 436 is rotatably coupled with the high-pressure turbine 438 via a high-speed shaft 440 to enable the high-pressure turbine 438 to drive the high-pressure compressor 436.

In some embodiments, the engine 400 can comprise a pitch change mechanism 482 coupled to the fan assembly 404 and configured to vary the pitch of the fan blades 408. In certain embodiments, the pitch change mechanism 482 can be a linear actuated pitch change mechanism.

In some embodiments, the engine 400 can comprise a variable fan nozzle. Operationally, the engine 400 may include a control system that manages the loading of the fan, as well as potentially the exit area of the variable fan nozzle, to provide different thrust, noise, cooling capacity and other performance characteristics for various portions of the flight envelope and various operational conditions associated with aircraft operation. For example, nozzle actuation modulates the fan operating line and overall engine fan pressure ratio independent of total engine airflow.

Figure 5:
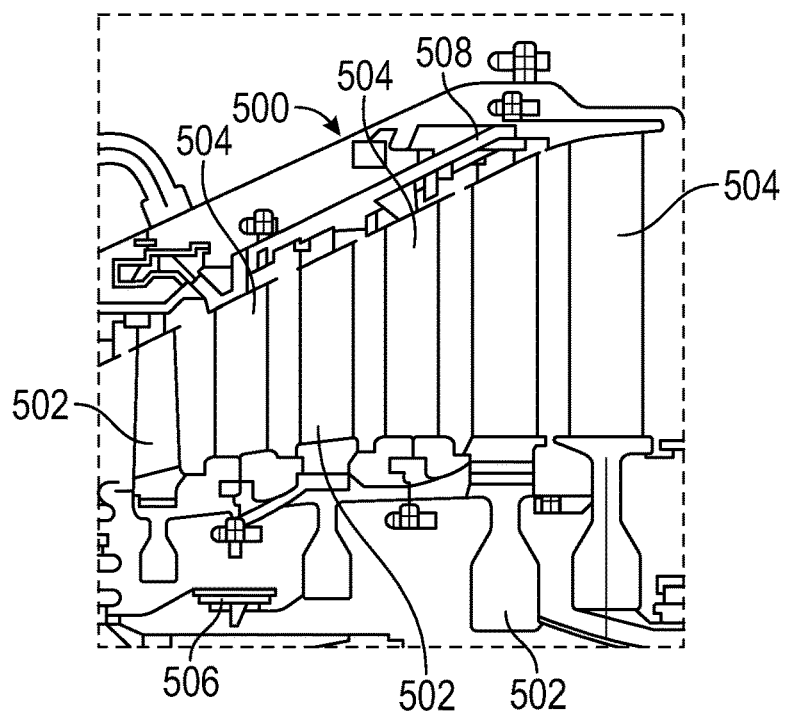
FIG. 5 is a cross-sectional schematic illustration of an exemplary embodiment of a counter-rotating low-pressure turbine of a turbomachine engine, the low-pressure turbine having a 3×3 configuration.
Figure 6:
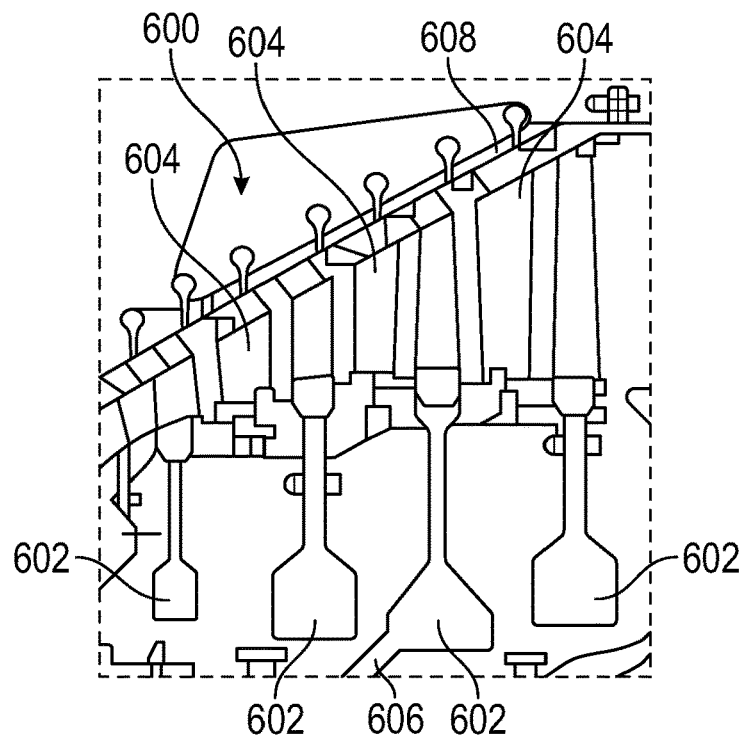
FIG. 6 is a cross-sectional schematic illustration of an exemplary embodiment of a counter-rotating low-pressure turbine of a turbomachine engine, the low-pressure turbine having a 4×3 configuration.

In some embodiments, an engine (e.g., the engine 100, the engine 200, and/or the engine 400) can comprise a counter-rotating low-pressure turbine. For example, FIGS. 5-6 depict schematic cross-sectional illustrations of counter-rotating low-pressure turbines. In particular, FIG. 5 depicts a counter-rotating turbine 500, and FIG. 6 depicts a counter-rotating turbine 600. The counter-rotating turbines comprise inner blade stages and outer blade stages arranged in an alternating inner-outer configuration. In other words, the counter-rotating turbines do not comprise stator vanes disposed between the blade stages.

Referring to FIG. 5, the counter-rotating turbine 500 comprises a plurality of inner blade stages 502 and a plurality of outer blade stages 504. More specifically, the counter-rotating turbine 500 includes three inner blades stages 502 that are coupled to and extend radially outwardly from an inner shaft 506 (which can also be referred to as "a rotor") and three outer blade stages 504 that are coupled to extend radially inwardly from an outer shaft 508 (which can also be referred to as "a drum"). In this manner, the counter-rotating turbine 500 can be considered a six stage turbine.

Referring to FIG. 6, the counter-rotating turbine 600 comprises a plurality of inner blade stages 602 and a plurality of outer blade stages 604. More specifically, the counter-rotating turbine 600 includes four inner blades stages 602 that are coupled to and extend radially outwardly from an inner shaft 606 and three outer blade stages 604 that are coupled to extend radially inwardly from an outer shaft 608. In this manner, the counter-rotating turbine 600 can be considered a seven stage turbine.

According to some embodiments there is a turbomachine characterized by both a high gear ratio and a high power gearbox. A high gear ratio gearbox means a gearbox with a gear ratio of above about 4:1. Examples of a high power gearbox include a gearbox adapted for transmitting power greater than 7 MW with output spool speed above, e.g., 1000 rpm, a gearbox adapted for transmitting power greater than 15 MW with output spool speed of about 1100 rpm, and a gearbox adapted for transmitting power greater than transmitting 22 MW with output spool speed of about 3500 rpm.

Each of the embodiments of turbomachines disclosed herein utilize a high gear ratio gearbox. Adoption of a gearbox having a high gear ratio presents unique challenges. One such challenge is determining the amount of oil that would need to circulate through the gearbox during operation, i.e., the high gear ratio gearbox's oil flow rate. The oil demand is significant when the engine requires a high gear ratio gearbox. Moreover, the estimated amount of oil flow for the high gear ratio gearbox is not well informed by, or capable of being estimated from, oil flow rates for an existing serviced engine. Starting from this basis, the inventors set out to calculate the oil flow demands for the different engine embodiments contemplated and disclosed herein, by consideration of the different features and performance characteristics, e.g., pitch line velocity and constants differentiating one gearbox configuration from another. The high gear ratio gearbox architectures considered include those described and disclosed herein (e.g., FIGS. 9-13 and the accompanying text, infra). These efforts accordingly involved factoring in specific characteristics of the gearboxes and the power transmission requirements for the gearbox to estimate the oil flow rates.

During the process of developing the aforementioned embodiments of turbomachines incorporating a high gear ratio gearbox, the inventors discovered, unexpectedly, that a good approximation of the high gear ratio gearbox oil flow rate may be made using only a relatively few engine parameters. This development is based on, among other things, the recognition that an oil flow rate through a gearbox is related to the expected power loss when transmitting power across a gearbox. From this initial recognition and other developments that were the by-product of studying several different engine configurations that included a power gearbox (including the configurations disclosed herein), the inventors ultimately discovered that a good approximation to the high gear ratio gearbox oil flow rate could be made based on a relationship among the turbomachine's gearbox gear ratio, net thrust, and fan diameter. The inventors refer to this relationship as a gearbox efficiency rating.

This discovery is quite beneficial. For example, with the gearbox efficiency rating having provided the engine oil flow requirements one can also estimate, for purposes of system integration, the type of oil-related secondary systems (e.g., sump, oil circuit, heat sinks, etc.) that would be included to support proper functioning of the selected high gear ratio gearbox; and/or to provide guidance on whether a particular engine architecture is beneficial or not, without requiring an entire team to complete the tedious and time-consuming process of developing a new gearbox from scratch. Therefore, the gearbox efficiency rating can improve the process of developing a turbomachine engine, which can ultimately result in improved turbomachines.

As indicated, the gearbox efficiency rating is a relationship based on a turbomachine's fan diameter (D), net thrust (T), and gear ratio of a high gear ratio gearbox. The gear efficiency rating, valid for gear ratios between about 4:1 and 14:1, may be expressed as $$Q\left(\frac{D^{1.56}}{T}\right)^{1.53},$$

where Q is measured at an inlet of the gearbox in gallons per minute at a max takeoff condition, D is measured in inches, and T is measured in pounds force at the max takeoff condition. In this manner, the gearbox efficiency rating defines a specific turbomachine engine configuration.

As used herein "net thrust" (T) equals the change of momentum of the bypass airflow plus the change of momentum of the core airflow and the burned fuel. Or stated another way, $T=W_{byp}(V_{byp}-V_0)+(W_{core}-W_{fuel})\ V_{core}-W_{core}\ V_0$, where $W_{byp}$ is the mass flow rate of air of the bypass airflow, $V_{byp}$ is the velocity of the bypass airflow, $V_0$ is the flight velocity, $W_{core}$ is the mass flow rate of air of the core airflow, $W_{fuel}$ is the mass flow rate of the burned fuel, and $V_{core}$ is the velocity of the core airflow.

As indicated earlier, turbomachine engines, such as the turbofan engines 100, 200, 300, 400, comprise many variables and factors that affect their performance and/or operation. The interplay between the various components can make it particularly difficult to develop or select one component, especially when each of the components is at a different stage of completion. For example, one or more components may be nearly complete, yet one or more other components may be in an initial or preliminary phase where only one (or a few) parameters is known. Also, each component is subject to change often more than once over the development period, which can often last for many years (e.g., 5-15 years). These complex and intricate individual and collective development processes can be cumbersome and inefficient. For at least these reasons, there is a need for devices and methods that can provide a good estimate of, not only the basic configuration or sizing needed to achieve the desired performance benefits, but also to reflect the penalties or accommodations in other areas in order to realize the desired benefits.

According to another aspect of the disclosure, the gearbox efficiency rating may additionally provide a particularly useful indication of the efficiency and effectiveness of the engine during initial development, e.g., as a tool to accept or reject a particular configuration. Thus, the gearbox efficiency rating can be used, for example, to guide gearbox development. For example, the gearbox efficiency rating can be used to quickly and accurately determine the size of the gearbox that is suitable for a particular engine without requiring an individual or team to complete the tedious and time-consuming process of developing the gearbox from scratch. Therefore, the gearbox efficiency rating can also improve the process of developing a turbomachine engine.

Figure 7A:
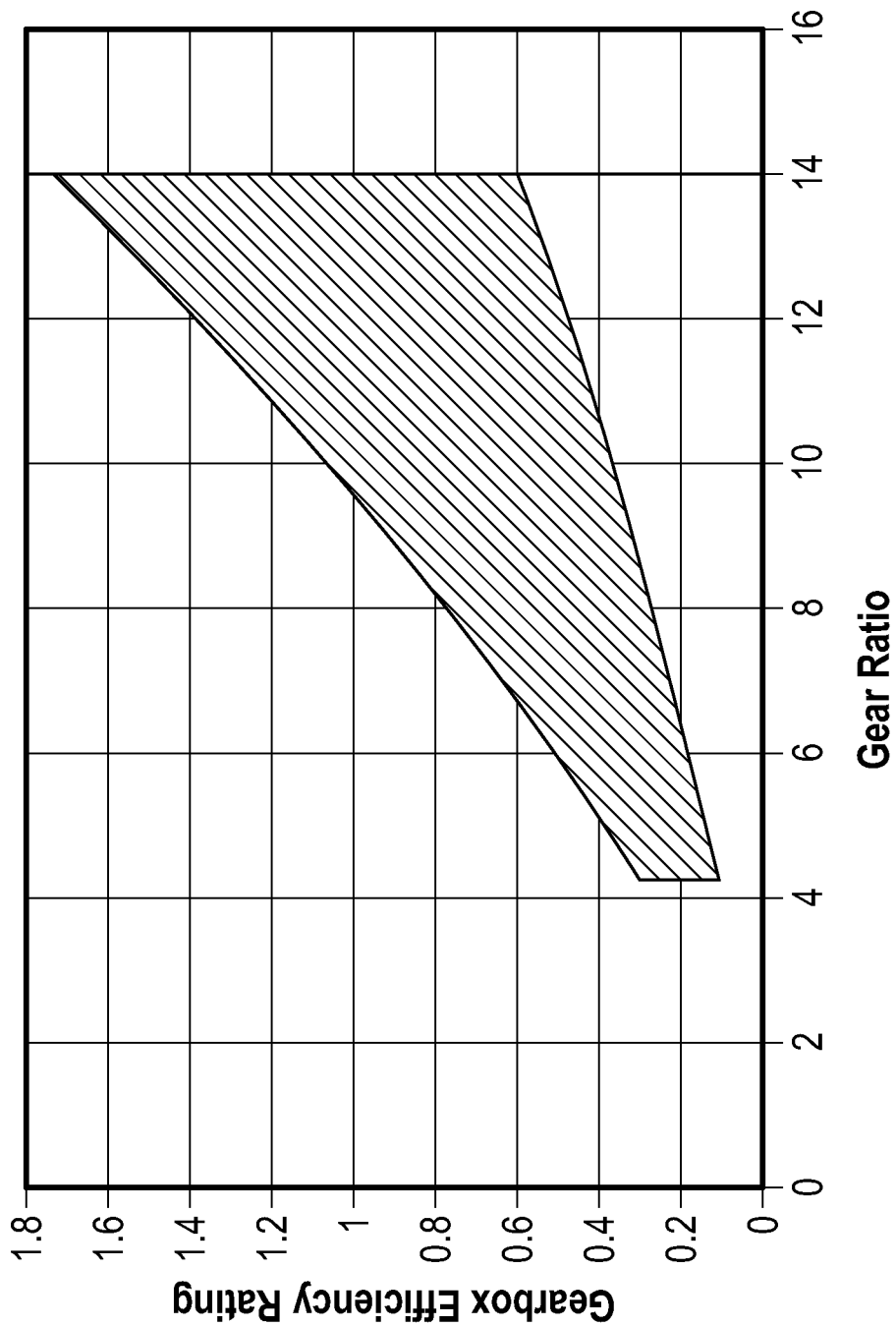
FIG. 7A is a graph depicting an exemplary range of gearbox efficiency ratings relative to an exemplary range of gear ratios for a turbomachine engine.
Figure 7B:
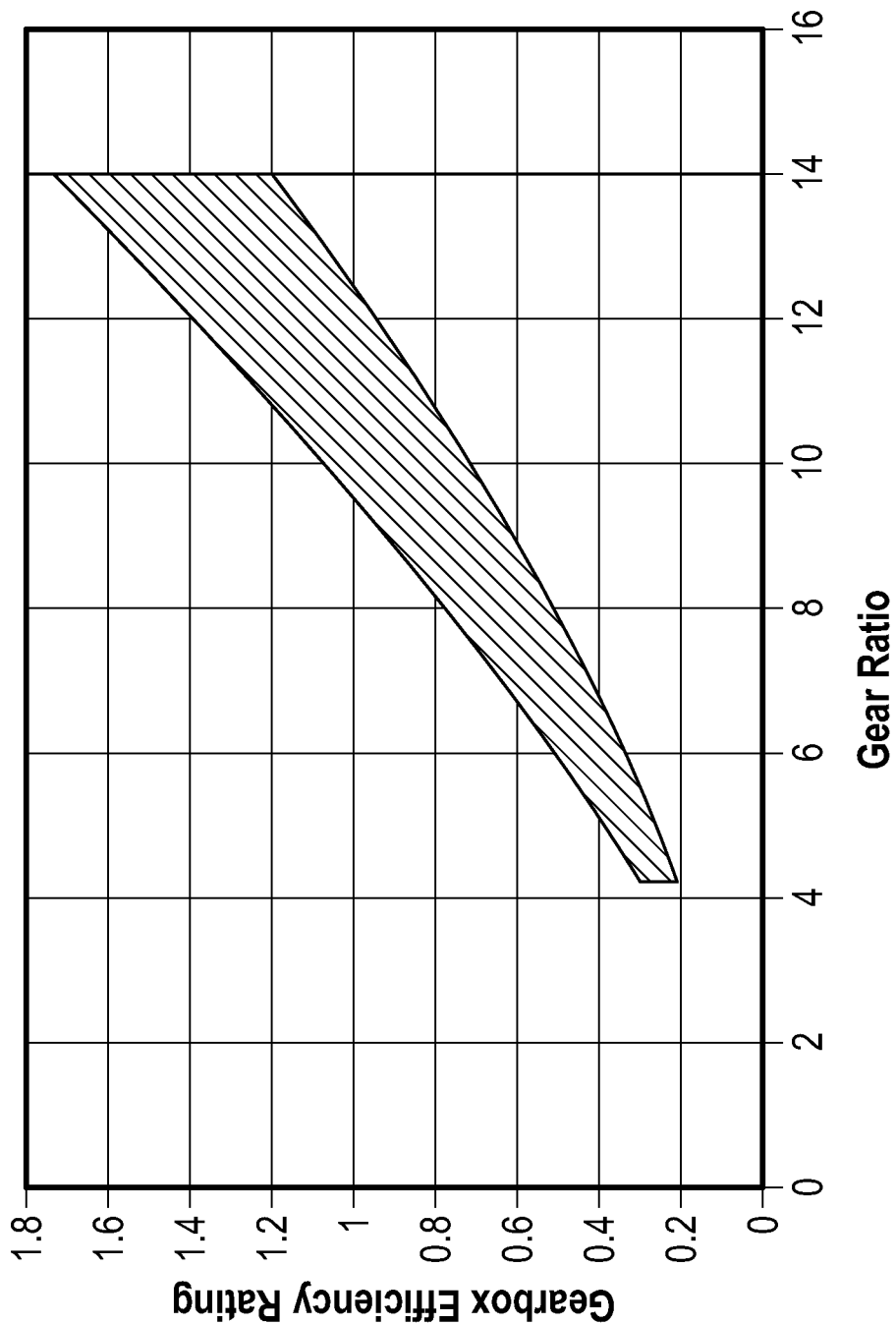
FIG. 7B is a graph depicting another exemplary range of gearbox efficiency ratings relative to an exemplary range of gear ratios for a turbomachine engine.
Figure 7C:
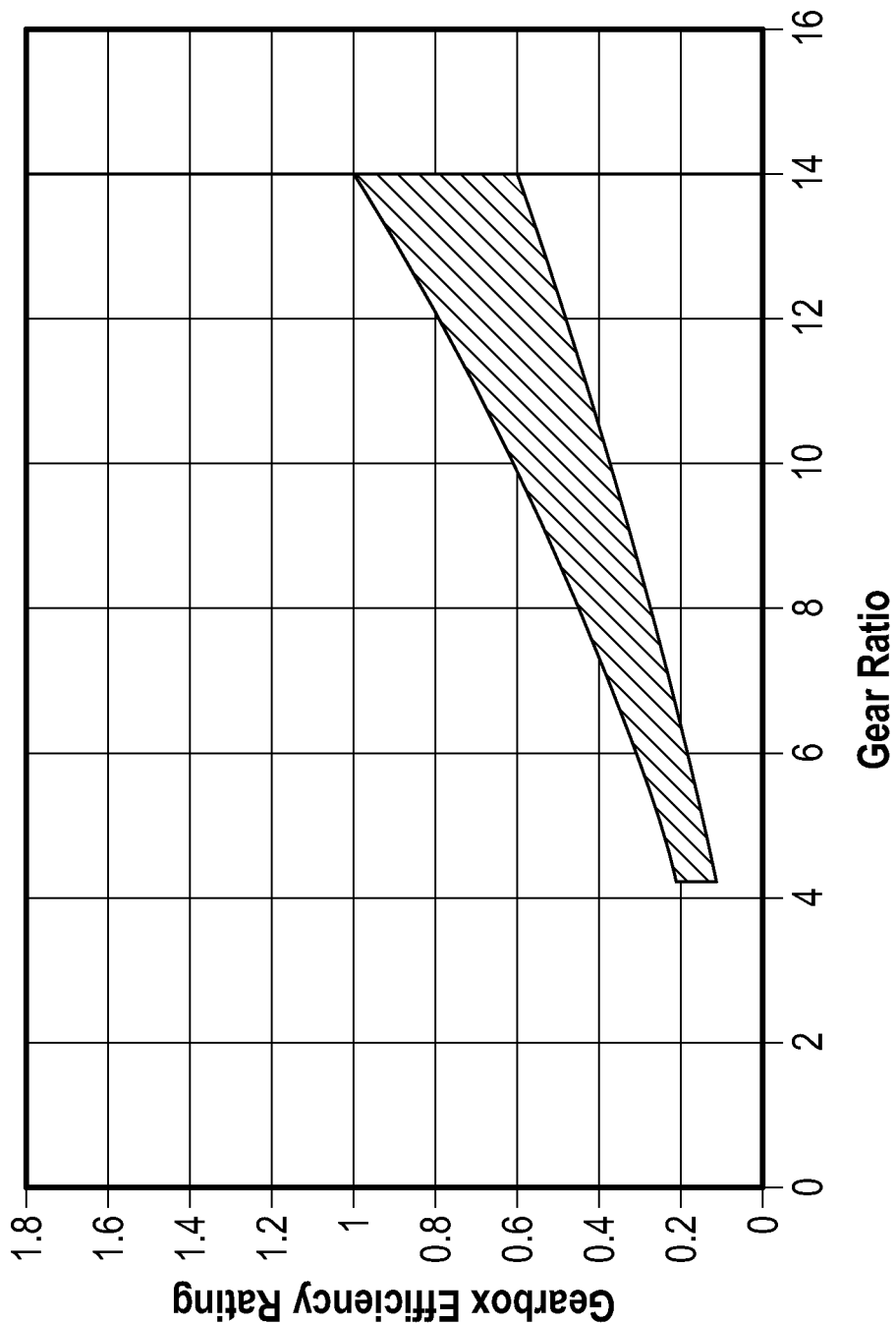
FIG. 7C is a graph depicting another exemplary range of gearbox efficiency ratings relative to an exemplary range of gear ratios for a turbomachine engine.

FIGS. 7A-8 illustrate exemplary ranges and/or values for gear efficiency rating. FIGS. 7A-7C disclose exemplary ranges of gear efficiency rating with respect to various gear ratios. FIG. 8 discloses the gear ratio, oil flow, fan diameter, net thrust, and gearbox efficiency ratings for multiple exemplary turbomachine engines.

In some embodiments, the gearbox efficiency rating of a turbomachine engine is within a range of about 0.10-1.8 or 0.19-1.8 or 0.10-1.01. In certain embodiments, the gearbox efficiency rating is within a range of about 0.25-0.55 or about 0.29-0.51. FIG. 8 provides the gear efficiency rating of several exemplary engines.

In some embodiments, the oil flow rate Q is within a range of about 5-55 gallons per minute. In certain embodiments, the oil flow rate Q is within a range of about 5.5-25 gallons per minute. FIG. 8 also provides the oil flow rates of several exemplary engines.

As noted above, the oil flow rate Q is measured at an inlet of the gearbox in gallons per minute at a max takeoff condition. The inlet of the gearbox is the location at which the oil enters the gearbox from the oil supply line. As used herein "a max takeoff condition" means sea-level elevation, standard pressure, extreme hot day temperature, and a flight velocity of up to about 0.25 Mach.

As used herein, the term "extreme hot day temperature" means the extreme hot day temperature specified for a particular engine. This can include the extreme hot day temperature used for engine certification. Extreme hot day temperature can additionally or alternatively include temperatures of about 130-140° F.

In some embodiments, the fan diameter D is about 120-216 inches. In certain embodiments, the fan diameter D is about 120-192 inches. FIG. 8 also provides the fan diameter of several exemplary engines.

In some embodiments, the net thrust T of the engine is within a range of about 10,000-100,000 pounds force. In particular embodiments, the net thrust T of the engine is within a range of about 12,000-30,000 pounds force. FIG. 8 also provides the net thrust of several exemplary engines.

In some embodiments, the gearbox efficiency rating of a turbomachine engine can be configured in relation to the gear ratio (GR) of the gearbox. For example, in certain embodiments, a turbomachine engine can be configured such that the gearbox efficiency rating is greater than 0.015 $(GR^{1.4})$ and less than $0.034(GR^{1.5})$, as depicted in FIG. 7A. In other embodiments, a turbomachine engine can be configured such that the gearbox efficiency rating is greater than $0.02625(GR^{1.4})$ and less than $0.042(GR^{1.4})$.

For example, FIG. 8 depicts several exemplary engines with gearbox efficiency ratings that satisfy these relationships. Engine 1 is a turbomachine engine comprising a gearbox with a gear ratio of 10.5:1 and a gearbox efficiency rating within a range of 0.40-1.16, specifically 1.02. Engine 2, Engine 3, and Engine 4 are turbomachine engines comprising gearboxes with a gear ratio of 7:1 and the gearbox efficiency ratings within a range of 0.23-0.63, that is 0.51, 0.42, and 0.41, respectively. Engine 5 is a turbomachine engine comprising a gearbox with a gear ratio of 5.1:1 and a gearbox efficiency rating within a range of 0.15-0.39, specifically 0.29. Engine 6 is a turbomachine engine comprising a gearbox with a gear ratio of 4.1:1 and a gearbox efficiency rating within a range of 0.11-0.28, specifically 0.21. Engines 7-19 provide additional examples with specific gearbox efficiency ratings. Ranges for the gearbox efficiency ratings of Engines 7-19 can be determined using the equations above and/or the charts of FIGS. 7A-7C.

As another example, a turbomachine engine comprising a gearbox with a gear ratio of 4.5:1 can be configured such that the gearbox efficiency rating is within a range of 0.12-0.32. As another example, a turbomachine engine comprising a gearbox with a gear ratio of 6:1 can be configured such that the gearbox efficiency rating within a range of 0.18-0.50. As another example, a turbomachine engine comprising a gearbox with a gear ratio of 9:1 can be configured such that the gearbox efficiency rating within a range of 0.33-0.92. As another example, a turbomachine engine comprising a gearbox with a gear ratio of 11:1 can be configured such that the gearbox efficiency rating within a range of 0.43-1.24. As another example, a turbomachine engine comprising a gearbox with a gear ratio of 12:1 can be configured such that the gearbox efficiency rating within a range of 0.49-1.41. As yet another example, a turbomachine engine comprising a gearbox with a gear ratio of 14:1 can be configured such that the gearbox efficiency rating is within a range of 0.60-1.78.

In some instances, a turbomachine engine can comprise a gearbox with a gear ratio of 5-6, 7-8, 9-10, 11-12, or 13-14. In other instances, a turbomachine engine can comprise a gearbox with a gear ratio of 5-7, 8-10, 11-13. In yet other embodiments, a turbomachine engine can comprise a gearbox with a gear ratio of 7-10 or 11-14. Below is a table with several exemplary gearbox efficiency ratings with respect to several exemplary gear ratios.

| Gear Ratio | Gearbox Efficiency Rating |
|---|---|
| 4.1-6.9 | 0.10-0.62 |
| 7.0-9.9 | 0.22-1.06 |
| 10.0-12.9 | 0.37-1.56 |
| 13.0-14.0 | 0.54-1.8 |

In some embodiments, a turbomachine engine can be configured such that the gearbox efficiency rating is greater than $0.023(GR^{1.5})$ and less than $0.034(GR^{1.5})$, as depicted in FIG. 7B. In particular instances, the gearbox efficiency rating can be about $0.0275(GR^{1.5})$. These embodiments can be particularly advantageous, for example, with engines comprising an epicyclic gearbox (e.g., star and/or planet configuration).

| Gear Ratio | Gearbox Efficiency Rating |
|---|---|
| 4.1-6.9 | 0.19-0.62 |
| 7.0-9.9 | 0.43-1.06 |
| 10.0-12.9 | 0.73-1.58 |
| 13.0-14.0 | 1.08-1.8 |

In other embodiments, a turbomachine engine can be configured such that the gearbox efficiency rating is greater than $0.015(GR^{1.4})$ and less than $0.025(GR^{1.4})$, as depicted in FIG. 7C. In particular instances, the gearbox efficiency rating can be about $0.02(GR^{1.4})$. These embodiments can be particularly advantageous, for example, with engines comprising a non-epicyclic gearbox (e.g., compound gearboxes).

| Gear Ratio | Gearbox Efficiency Rating |
|---|---|
| 4.1-6.9 | 0.10-0.37 |
| 7.0-9.9 | 0.23-0.62 |
| 10.0-12.9 | 0.38-0.90 |
| 13.0-14.0 | 0.54-1.01 |

It should be noted gearbox efficiency rating values disclosed herein are approximate values. Accordingly, the disclosed gearbox efficiency rating values include values within five percent of the listed values.

As noted above, the gearbox efficiency rating can define a specific engine configuration and/or can be used when developing a gearbox for a turbomachine engine. For example, in some instances, the gearbox efficiency rating can be used to determine the size and/or oil flow rate of a gearbox. Assuming that a desired gear ratio of the gearbox is known, along with the fan diameter, and the net thrust of the engine, the gearbox efficiency ratings depicted in the charts of FIG. 7A-7C can be used to determine an acceptable oil flow rate. In some embodiments, the equation below can be used to determine an acceptable range of oil flow rates (Q) for the gearbox. The determined oil flow rate Q can be used, for example, to aid in the configuration of the gearbox. In some instances, one or more other parameters (e.g., the gearbox efficiency rating) can also aid in the configuration of the gearbox.

$$\frac{0.015(GR^{1.4})}{\left(\frac{D^{1.56}}{T}\right)^{1.53}} < Q < \frac{0.034(GR^{1.5})}{\left(\frac{D^{1.56}}{T}\right)^{1.53}}$$

For example, a gearbox for a turbomachine engine can be configured using the following exemplary method. With reference to FIG. 8, Engine 1 comprises an unducted fan and can be configured similar to the engine 200. Engine 1 comprises a fan diameter of 188.6 inches and a net thrust of 25,503 pounds force at a max takeoff condition. Engine 1 further comprises a five stage low-pressure turbine. The desired gear ratio for the gearbox of Engine 1 is about 10.5:1. Based on this information, oil flow rate Q of the gearbox of Engine 1 should be about 8-24 gallons per minute at a max takeoff condition.

FIG. 9 schematically depicts a gearbox 700 that can be used, for example, with Engine 1. The gearbox 700 comprises a two-stage star configuration.

The first stage of the gearbox 700 includes a first-stage sun gear 702, a first-stage carrier 704 housing a plurality of first-stage star gears, and a first-stage ring gear 706. The first-stage sun gear 702 can be coupled to a low-speed shaft 708, which in turn is coupled to the low-pressure turbine of Engine 1. The first-stage sun gear 702 can mesh with the first-stage star gears, which mesh with the first-stage ring gear. The first-stage carrier 704 can be fixed from rotation by a support member 710.

The second stage of the gearbox 700 includes a second-stage sun gear 712, a second-stage carrier 714 housing a plurality of second-stage star gears, and a second-stage ring gear 716. The second-stage sun gear 712 can be coupled to a shaft 718 which in turn is coupled to the first-stage ring gear 706. The second-stage carrier 714 can be fixed from rotation by a support member 720. The second-stage ring gear 716 can be coupled to a fan shaft 722.

In some embodiments, each stage of the gearbox 700 can comprise five star gears. In other embodiments, the gearbox 700 can comprise fewer or more than five star gears in each stage. In some embodiments, the first-stage carrier can comprise a different number of star gears than the second-stage carrier. For example, the first-carrier can comprise five star gears, and the second-stage carrier can comprise three star gears, or vice versa.

Based on the configuration of the gearbox 700 and the calculated oil flow rate of 8-24 gallons per minute, which is based on the gearbox efficiency rating, the gearbox 700 can comprise a radius $R_1$. The size of the gearbox, including the radius $R_1$, can be configured such that the oil flow rate at the inlet of the gearbox 700 at a max takeoff condition is about 8-24 gallons per minute or about 16-24 gallons per minute (e.g., 20.9 gpm). In some embodiments, the radius $R_1$ of the gearbox 700 can be about 16-19 inches. In other embodiments, the radius $R_1$ of the gearbox 700 can be about 22-24 inches. In other embodiments, the radius $R_1$ of the gearbox 700 can be smaller than 16 inches or larger than 24 inches.

As another example, Engine 2 (FIG. 8) comprises an unducted fan and can be configured similar to the engine 200. Engine 3 comprises a fan diameter of 188.6 inches and a net thrust of 25,000 pounds force at a max takeoff condition. Engine 2 further comprises a 3-7 stage low-pressure turbine. The desired gear ratio for the gearbox of Engine 2 is about 7:1. Based on this information, oil flow rate Q of the gearbox of Engine 2 should be about 4-13 gallons per minute or about 8-13 gallons per minute (e.g., 10.06) at a max takeoff condition.

FIG. 10 schematically depicts a gearbox 800 that can be used, for example, with Engine 2. The gearbox 800 comprises a single-stage star configuration. The gearbox 800 includes a sun gear 802, a carrier 804 housing a plurality of star gears (e.g., 3-5 star gears), and a ring gear 806. The sun gear 802 can mesh with the star gears, and the star gears can mesh with the ring gear 806. The sun gear 802 can be coupled to a low-speed shaft 808, which in turn is coupled to the low-pressure turbine of Engine 2. The carrier 804 can be fixed from rotation by a support member 810. The ring gear 806 can be coupled to a fan shaft 812.

Based on the configuration of the gearbox 800 and the calculated oil flow rate of 4-13 gallons per minute, which is based on the gearbox efficiency rating, the gearbox 800 can comprise a radius $R_2$. The size of the gearbox, including the radius $R_2$, can be configured such that the oil flow rate at the inlet of the gearbox 800 at a max takeoff condition is 7-13 gallons per minute (e.g., 10.1 gpm). In some embodiments, the radius $R_2$ of the gearbox 800 can be about 18-23 inches. In other embodiments, the radius $R_2$ of the gearbox 700 can be smaller than 18 inches or larger than 23 inches.

As another example, Engine 3 (FIG. 8) comprises an unducted fan and can be configured similar to the engine 200. Engine 3 comprises a fan diameter of 142.8 inches and a net thrust of 12,500 pounds force at a max takeoff condition. Engine 3 further comprises a 3-7 stage low-pressure turbine. The desired gear ratio for the gearbox of Engine 3 is about 7:1. Based on this information, oil flow rate Q of the gearbox of Engine 3 should be about 3-9 gallons per minute or about 5-9 gallons per minute (e.g., 6 gpm) at a max takeoff condition.

FIG. 11 schematically depicts a gearbox 900 that can be used, for example, with Engine 3. The gearbox 800 comprises a single-stage star configuration. The gearbox 900 includes a sun gear 902, a carrier 904 housing a plurality of star gears (e.g., 3-5 star gears), and a ring gear 906. The sun gear 902 can mesh with the star gears, and the star gears can mesh with the ring gear 906. The sun gear 902 can be coupled to a low-speed shaft 908, which in turn is coupled to the low-pressure turbine of Engine 3. The carrier 904 can be fixed from rotation by a support member 910. The ring gear 906 can be coupled to a fan shaft 912.

Based on the configuration of the gearbox 900 and the calculated oil flow rate of 5-9 gallons per minute, which is based on the gearbox efficiency rating, the gearbox 900 can comprise a radius $R_3$. The size of the gearbox, including the radius $R_3$, can be configured such that the oil flow rate at the inlet of the gearbox 900 at a max takeoff condition is 3-9 gallons per minute (e.g., 6 gpm). In some embodiments, the radius $R_3$ of the gearbox 900 can be about 10-13 inches. In other embodiments, the radius $R_3$ of the gearbox 900 can be smaller than 10 inches or larger than 13 inches.

Engine 4 comprises an unducted fan and can be configured similar to the engine 200. Engine 4 comprises a fan diameter of 188.4 inches and a net thrust of 25,000 pounds force at a max takeoff condition. Engine 4 further comprises a counter-rotating low-pressure turbine (e.g., similar to the counter-rotating turbine 500 or the counter-rotating turbine 600). The desired gear ratio for the gearbox of Engine 4 is about 7:1. Based on this information, oil flow rate Q of the gearbox of Engine 4 should be about 4-13 gallons per minute or about 7-13 gallons per minute (e.g., 8.1 gpm) at a max takeoff condition.

Figure 12:
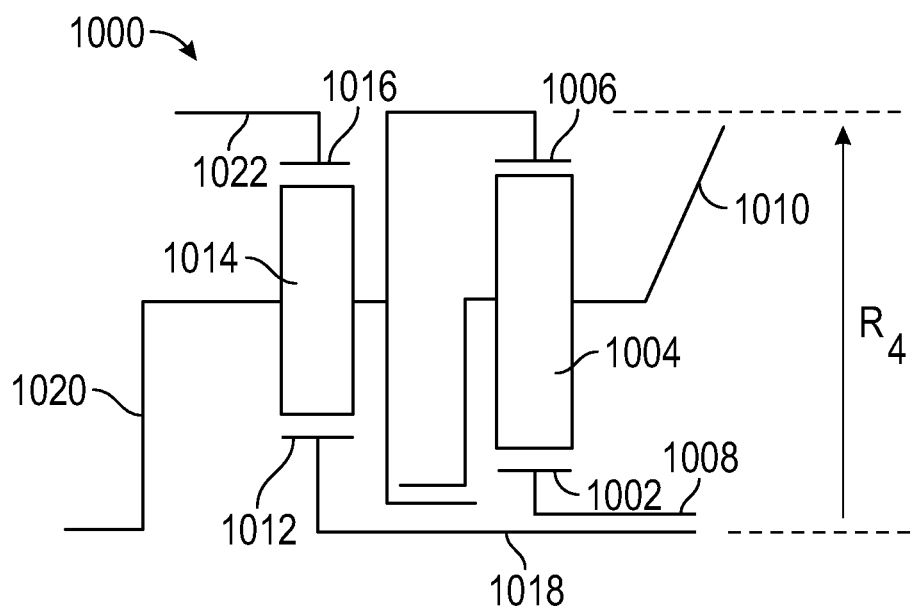
FIG. 12 is a cross-sectional schematic illustration of an exemplary embodiment of a gearbox configuration for a turbomachine engine.

FIG. 12 schematically depicts a gearbox 1000 that can be used, for example, with Engine 4. The gearbox 1000 comprises a two-stage configuration in which the first stage is a star configuration and the second stage is a planet configuration.

The first stage of the gearbox 1000 includes a first-stage sun gear 1002, a first-stage star carrier 1004 comprising a plurality of first-stage star gears (e.g., 3-5 star gears), and a first-stage ring gear 1006. The first-stage sun gear 1002 can mesh with the first-stage star gears, and the first-stage star gears can mesh with the first-stage ring gear 1006. The first-stage sun gear 1002 can be coupled to a higher-speed shaft 1008 of the low spool, which in turn is coupled to the inner blades of the low-pressure turbine of Engine 4. The first-stage star carrier 1004 can be fixed from rotation by a support member 1010.

The second stage of the gearbox 1000 includes a second-stage sun gear 1012, a second-stage planet carrier 1014 comprising a plurality of second-stage planet gears (e.g., 3-5 planet gears), and a second-stage ring gear 1016. The second-stage sun gear 1012 can mesh with the second-stage planet gears. The second-stage planet carrier 1014 can be coupled to the first-stage ring gear 1006. The second-stage sun gear 1012 can be coupled to a lower-speed shaft 1018 of the low spool, which in turn is coupled to the outer blades of the low-pressure turbine of Engine 4. The second-stage planet carrier 1014 can be coupled to the first-stage ring gear 1006. The second-stage planet carrier 1014 can also be coupled to a fan shaft 1020. The second-stage ring gear 1016 can be fixed from rotation by a support member 1022.

In some embodiments, each stage of the gearbox 1000 can comprise three star/planet gears. In other embodiments, the gearbox 1000 can comprise fewer or more than three star/planet gears in each stage. In some embodiments, the first-stage carrier can comprise a different number of star gears than the second-stage carrier has planet gears. For example, the first-carrier can comprise five star gears, and the second-stage carrier can comprise three planet gears, or vice versa.

Since the first stage of the gearbox 1000 is coupled to the higher-speed shaft 1008 of the low spool and the second stage of the gearbox 1000 is coupled to the lower-speed shaft 1018 of the low spool, the gear ratio of the first stage of the gearbox 1000 can be greater than the gear ratio of the second stage of the gearbox. For example, in certain embodiments, the first stage of the gearbox can comprise a gear ratio of 4.1-14, and the second stage of the gearbox can comprise a gear ratio that is less than the gear ratio of the first stage of the gearbox. In particular embodiments, the first stage of the gearbox can comprise a gear ratio of 7, and the second stage of the gearbox can comprise a gear ratio of 6.

In some embodiments, an engine comprising the gearbox 1000 can be configured such that the higher-speed shaft 1008 provides about 50% of the power to the gearbox 1000 and the lower-speed shaft 1018 provides about 50% of the power to the gearbox 1000. In other embodiments, an engine comprising the gearbox 1000 can be configured such that the higher-speed shaft 1008 provides about 60% of the power to the gearbox 1000 and the lower-speed shaft 1018 provides about 40% of the power to the gearbox 1000.

Based on the configuration of the gearbox 1000 and the calculated oil flow rate of 4-13 gallons per minute, which is based on the gearbox efficiency rating, the gearbox 1000 can comprise a radius $R_4$. The size of the gearbox, including the radius $R_4$, can be configured such that the oil flow rate at the inlet of the gearbox 1000 at a max takeoff condition is 7-13 gallons per minute (e.g., 8.1 gpm). In some embodiments, the radius $R_4$ of the gearbox 1000 can be about 18-22 inches. In other embodiments, the radius $R_4$ of the gearbox 700 can be smaller than 18 inches or larger than 22 inches.

Thus, as illustrated by the examples disclosed herein, a gearbox efficiency rating can characterize or define a specific engine and/or gearbox configuration. As such, turbomachine engines can be quickly and accurately configured by utilizing the gearbox efficiency rating and/or its related parameters. In this manner, the gearbox efficiency rating disclosed herein provides one or more significant advantages over known turbomachine engines and/or known methods of developing turbomachine engines.

Figure 13:
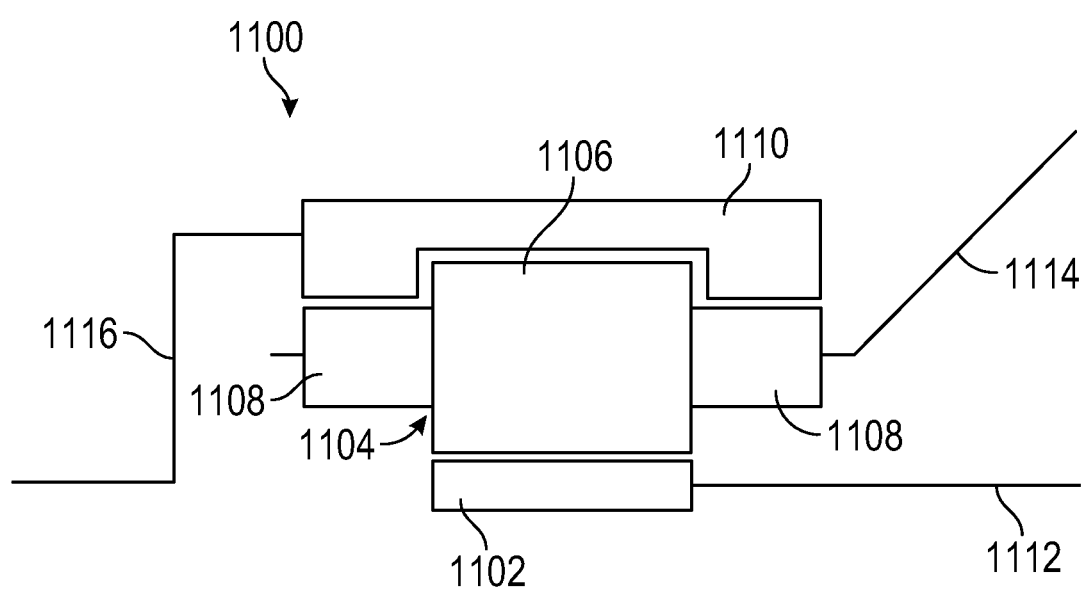
FIG. 13 is a cross-sectional schematic illustration of an exemplary embodiment of a gearbox configuration for a turbomachine engine.

FIG. 13 depicts a gearbox 1100 that can be used, for example, with the engines disclosed herein (e.g., the engines 100, 200, 400). The gearbox 1100 is configured as a compound star gearbox. The gearbox 1100 comprises a sun gear 1102 and a star carrier 1104, which includes a plurality of compound star gears having one or more first portions 1106 and one or more second portions 1108. The gearbox 1100 further comprises a ring gear 1110. The sun gear 1102 can also mesh with the first portions 1106 of the star gears. The star carrier can be fixed from rotation via a support member 1114. The second portions 1108 of the star gears can mesh with the ring gear 1110. The sun gear 1102 can be coupled to a low-pressure turbine via the turbine shaft 1112. The ring gear 1110 can be coupled to a fan shaft 1116.

The gear assemblies shown and described herein can be used with any suitable engine. For example, although FIG. 4 shows an optional ducted fan and optional fan duct (similar to that shown in FIG. 2), it should be understood that such gear assemblies can be used with other ducted turbofan engines (e.g., the engine 300) and/or other open rotor engines that do not have one or more of such structures.

Embodiments of the gear assemblies depicted and described herein may provide for gear ratios and arrangements that fit within the $L/D_{core}$ constraints of the disclosed engines. In certain embodiments, the gear assemblies depicted and described in regard to FIGS. 9-13 allow for gear ratios and arrangements providing for rotational speed of the fan assembly corresponding to one or more ranges of cruise altitude and/or cruise speed provided above.

Various embodiments of the gear assembly provided herein may allow for gear ratios of up to 14:1. Still various embodiments of the gear assemblies provided herein may allow for gear ratios of at least 4.1:1 or 4.5:1. Still yet various embodiments of the gear assemblies provided herein allow for gear ratios of 6:1 to 12:1. FIG. 8 also provides the gear ratio of several exemplary engines. It should be appreciated that embodiments of the gear assemblies provided herein may allow for large gear ratios and within constraints such as, but not limited to, length of the engine, maximum diameter ($D_{core}$) of the engine 100, cruise altitude of up to 65,000 ft, and/or operating cruise speed of up to Mach 0.85, or combinations thereof.

Various exemplary gear assemblies are shown and described herein. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachine having a turbine and a shaft rotatable with the turbine. With such an engine, the rotating element (e.g., fan assembly 104) may be driven by the shaft (e.g., low-speed shaft 146) of the turbomachine through the gear assembly.

Although the exemplary gear assemblies shown are mounted at a forward location (e.g., forward from the combustor and/or the low-pressure compressor), in other embodiments, the gear assemblies described herein can be mounted at a aft location (e.g., aft of the combustor and/or the low-pressure turbine).

Figure 14:
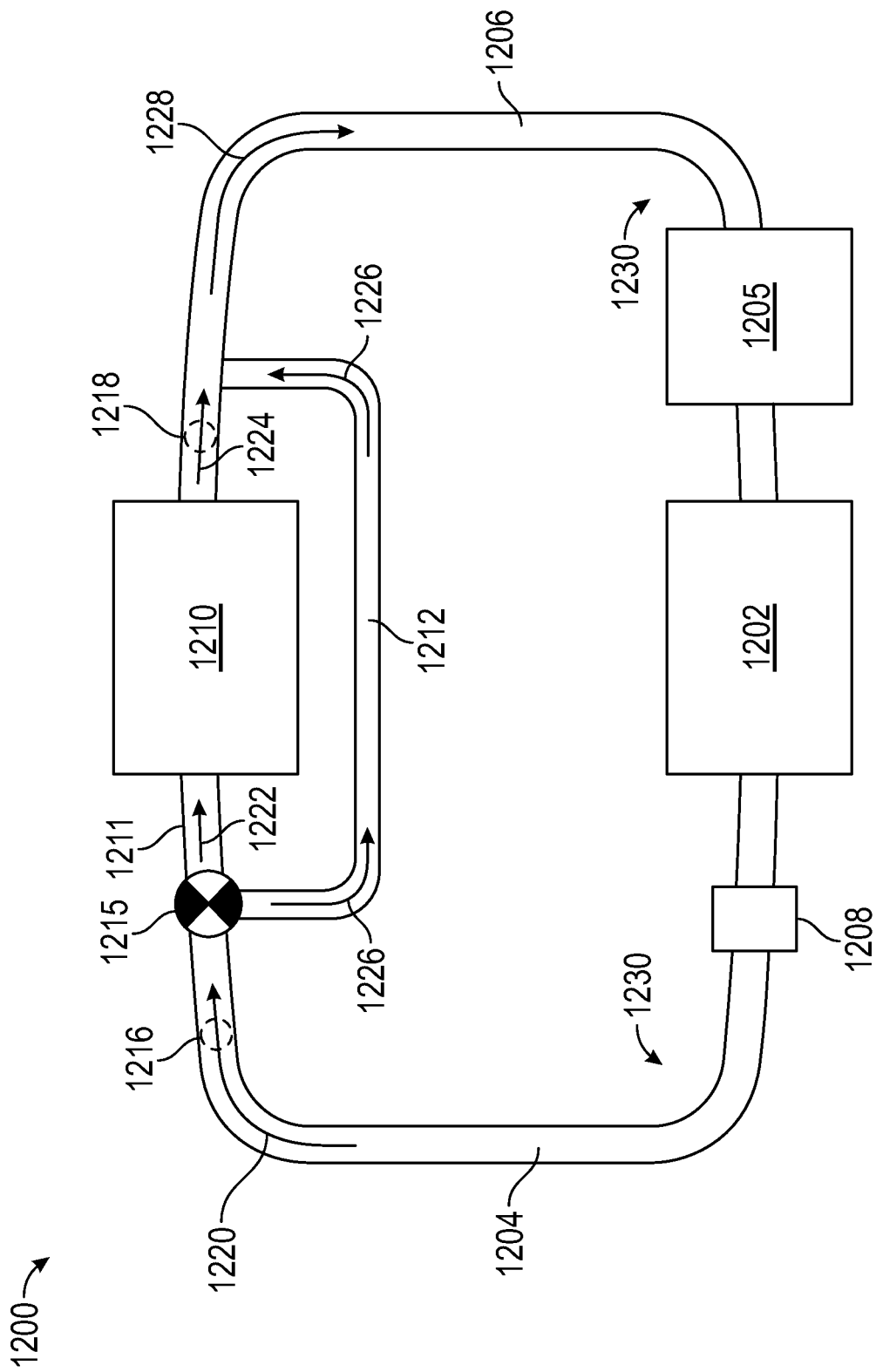
FIG. 14 is a schematic diagram of an exemplary lubricant system supplying lubricant to an engine component.

Portions of a lubricant system 1200 are depicted schematically in FIG. 14. The lubrication system 1200 can be a component of the turbomachine engines disclosed herein and/or can be coupled to the various gearboxes disclosed herein. For example, FIG. 1 schematically illustrates the lubricant system coupled to the turbomachine engine 100 and the gearbox 102. A series of lubricant conduits 1203 can interconnect multiple elements of the lubricant system 1200 and/or engine components, thereby providing for provision or circulation of the lubricant throughout the lubricant system and any engine components coupled thereto (e.g., a gearbox, bearing compartments, etc.).

It should be understood that the organization of the lubricant system 1200 as shown is by way of example only to illustrate an exemplary system for a turbomachine engine for circulating lubricant for purposes such as lubrication or heat transfer. Any organization for the lubricant system 1200 is contemplated, with or without the elements as shown, and/or including additional elements interconnected by any necessary conduit system.

Referring again to FIG. 14, the lubricant system 1200 includes a lubricant reservoir 1202 configured to store a coolant or lubricant, including organic or mineral oils, synthetic oils, or fuel, or mixtures or combinations thereof. A supply line 1204 and a scavenge line 1206 are fluidly coupled to the reservoir 1202 and collectively form a lubricant circuit to which the reservoir 1202 and component 1210 (e.g., a gearbox) can be fluidly coupled. The component 1210 can be supplied with lubrication by way of a fluid coupling with the supply line 1204 and can return the supplied lubricant to the reservoir 1202 by fluidly coupling to the scavenge line 1206. More specifically, a component supply line 1211 can be fluidly coupled between the supply line 1204 and the component 1210. It is further contemplated that multiple types of lubricant can be provided in other lines not explicitly shown, but are nonetheless included in the lubricant system 1200.

Optionally, at least one heat exchanger 1205 can be included in the lubricant system 1200. The heat exchanger 1205 can include a fuel/lubricant (fuel-to-lubricant) heat exchanger, an oil/lubricant heat exchanger, an air cooled oil cooler, and/or other means for exchanging heat. For example, a fuel/lubricant heat exchanger can be used to heat or cool engine fuel with lubricant passing through the heat exchanger. In another example, a lubricant/oil heat exchanger can be used to heat or cool additional lubricants passing within the turbomachine engine, fluidly separate from the lubricant passing along the lubricant system 1200. Such a lubricant/oil heat exchanger can also include a servo/lubricant heat exchanger. Optionally, a second heat exchanger (not shown) can be provided along the exterior of the core engine, downstream of the outlet guide vane assembly. The second heat exchanger can be an air/lubricant heat exchanger, for example, adapted to convectively cool lubricant in the lubricant system 1200 utilizing the airflow passing through an outlet guide vane assembly of the turbomachine engine.

A pump 1208 can be provided in the lubricant system 1200 to aid in recirculating lubricant from the reservoir 1202 to the component 1210 via the supply line 1204. For example, the pump 1208 can be driven by a rotating component of the turbine engine 10, such as a high-pressure shaft or a low-pressure shaft of a turbomachine engine.

Lubricant can be recovered from the component 1210 by way of the scavenge line 1206 and returned to the reservoir 1202. In the illustrated example, the pump 1208 is illustrated along the supply line 1204 downstream of the reservoir 1202. The pump 1208 can be located in any suitable position within the lubricant system 1200, including along the scavenge line 1206 upstream of the reservoir 1202. In addition, while not shown, multiple pumps can be provided in the lubricant system 1200.

In some embodiments, a bypass line 1212 can be fluidly coupled to the supply line 1204 and scavenge line 1206 in a manner that bypasses the component 1210. In such embodiments, a bypass valve 1215 is fluidly coupled to the supply line 1204, component supply line 1211, and bypass line 1212. The bypass valve 1215 is configured to control a flow of lubricant through at least one of the component supply line 1211 or the bypass line 1212. The bypass valve 1215 can include any suitable valve including, but not limited to, a differential thermal valve, rotary valve, flow control valve, and/or pressure safety valve. In some embodiments, a plurality of bypass valves can be provided.

During operation, a supply flow 1220 can move from the reservoir 1202, through the supply line 1204, and to the bypass valve 1215. A component input flow 1222 can move from the bypass valve 1215 through the component supply line 1211 to an inlet of the component 1210. A scavenge flow 1224 can move lubricant from an outlet of the component 1210 through the scavenge line 1206 and back to the reservoir 1202. Optionally, a bypass flow 1226 can move from the bypass valve 1215 through the bypass line 1212 and to the scavenge line 1206. The bypass flow 1226 can mix with the scavenge flow 1224 and define a return flow 1228 moving toward the lubricant reservoir 1202.

In one example where no bypass flow exists, it is contemplated that the supply flow 1220 can be the same as the component input flow 1222 and that the scavenge flow 1224 can be the same as the return flow 1228. In another example where the bypass flow 1226 has a nonzero flow rate, the supply flow 1220 can be divided at the bypass valve 1215 into the component input flow 1222 and bypass flow 1226. It will also be understood that additional components, valves, sensors, or conduit lines can be provided in the lubricant system 1200, and that the example shown in FIG. 14 is simplified with a single component 1210 for purposes of illustration.

The lubricant system 1200 can further include at least one sensing position at which at least one lubricant parameter can be sensed or detected. The at least one lubricant parameter can include, but is not limited to, a flow rate, a temperature, a pressure, a viscosity, a chemical composition of the lubricant, or the like. In the illustrated example, a first sensing position 1216 is located in the supply line 1204 upstream of the component 1210, and a second sensing position 1218 is located in the scavenge line 1206 downstream of the component 1210.

In one example, the bypass valve 1215 can be in the form of a differential thermal valve configured to sense or detect at least one lubricant parameter in the form of a temperature of the lubricant. In such a case, the fluid coupling of the bypass valve 1215 to the first and second sensing positions 1216, 1218 can provide for bypass valve 1215 sensing or detecting the lubricant temperature at the sensing positions 1216, 18 as lubricant flows to or from the bypass valve 1215. The bypass valve 1215 can be configured to control the component input flow 1222 or the bypass flow 1226 based on the sensed or detected temperature.

It is contemplated that the bypass valve 1215, supply line 1204, and bypass line 1212 can at least partially define a closed loop control system for the component 1210. As used herein, a "closed loop control system" will refer to a system having mechanical or electronic components that can automatically regulate, adjust, modify, or control a system variable without manual input or other human interaction. Such closed loop control systems can include sensing components to sense or detect parameters related to the desired variable to be controlled, and the sensed or detected parameters can be utilized as feedback in a "closed loop" manner to change the system variable and alter the sensed or detected parameters back toward a target state. In the example of the lubricant system 1200, the bypass valve 1215 (e.g. mechanical or electrical component) can sense a parameter, such as the lubricant parameter (e.g. temperature), and automatically adjust a system variable, e.g., flow rate to either or both of the bypass line 1212 or component 1210, without need of additional or manual input. In one example, the bypass valve can be automatically adjustable or self-adjustable such as a thermal differential bypass valve. In another example, the bypass valve can be operated or actuated via a separate controller. It will be understood that a closed loop control system as described herein can incorporate such a self-adjustable bypass valve or a controllable bypass valve.

Figure 15:
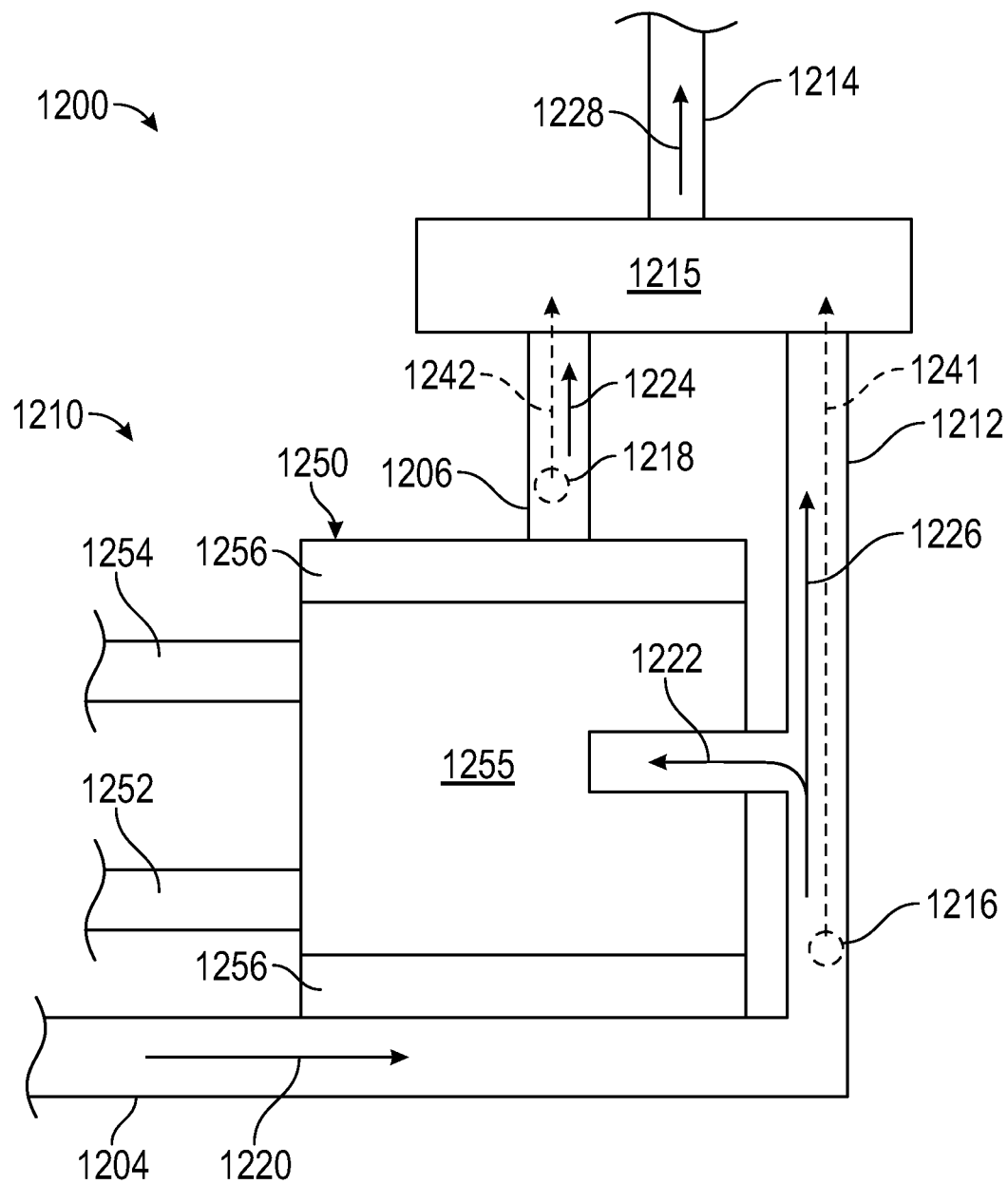
FIG. 15 is a schematic diagram of the lubricant system configured to supply lubricant to a gearbox.

Turning to FIG. 15, a portion of the lubricant system 1200 is illustrated supplying lubricant to a particular component 1210 in the form of a gearbox 1250 within a turbomachine engine. The gearbox can be any of the gearboxes disclosed herein. The gearbox 1250 can include an input shaft 1252, an output shaft 1254, and a gear assembly 1255. In one example, the gear assembly 1255 can be in the form of an epicyclic gear assembly as known in the art having a ring gear, sun gear, and at least one planet/star gear. An outer housing 1256 can at least partially surround the gear assembly 1255 and form a structural support for the gears and bearings therein. Either or both of the input and output shafts 1252, 1254 can be coupled to the turbomachine engine. In one example, the input and output shafts 1252, 1254 can be utilized to decouple the speed of the low-pressure turbine from the low-pressure compressor and/or the fan, which can, for example, improve engine efficiency.

The supply line 1204 can be fluidly coupled to the gearbox 1250, such as to the gear assembly 1255, to supply lubricant to gears or bearings to the gearbox 1250 during operation. The scavenge line 1206 can be fluidly coupled to the gearbox 1250, such as to the gear assembly 1255 or outer housing 1256, to collect lubricant. The bypass line 1212 can be fluidly coupled to the bypass valve 1215, supply line 1204, and scavenge line 1206 as shown. A return line 1214 can also be fluidly coupled to the bypass valve 1215, such as for directing the return flow 1228 to the lubricant reservoir 1202 for recirculation. While not shown in FIG. 15 for brevity, the lubricant reservoir 1202, the heat exchanger 1205, and/or the pump 1208 (FIG. 14) can also be fluidly coupled to the gearbox 1250. In this manner, the supply line 1204, bypass line 1212, scavenge line 1206, and return line 1214 can at least partially define a recirculation line 1230 for the lubricant system 1200.

The supply flow 1220 divides at the bypass line into the component input flow 1222 and the bypass flow 1226. In the example shown, the bypass valve 1215 is in the form of a differential thermal valve that is fluidly coupled to the first and second sensing positions 1216, 1218.

Lubricant flowing proximate the first and second sensing positions 1216, 1218 provides the respective first and second outputs 1241, 1242 indicative of the temperature of the lubricant at those sensing positions 1216, 1218. It will be understood that the supply line 1204 is thermally coupled to the bypass line 1212 and bypass valve 1215 such that the temperature of the fluid in the supply line 1204 proximate the first sensing position 1216 is approximately the same as fluid in the bypass line 1212 adjacent the bypass valve 1215. Two values being "approximately the same" as used herein will refer to the two values not differing by more than a predetermined amount, such as by more than 20%, or by more than 5 degrees, in some examples. In this manner, the bypass valve 1215 can sense the lubricant temperature in the supply line 1204 and scavenge line 1206 via the first and second outputs 1241, 1242. It can be appreciated that the bypass line 1212 can form a sensing line for the valve 1215 to sense the lubricant parameter, such as temperature, at the first sensing position 1216.

During operation of the turbomachine engine, the lubricant temperature can increase within the gearbox 1250, such as due to heat generation of the gearbox 1250, and throughout the lubricant system 1200. In one example, if a lubricant temperature exceeds a predetermined threshold temperature at either sensing position 1216, 1218, the bypass valve 1215 can automatically increase the component input flow 1222, e.g. from the supply line 1204 to the gearbox 1250, by decreasing the bypass flow 1226. Such a predetermined threshold temperature can be any suitable operating temperature for the gearbox 1250, such as about 300° F. in some examples. Increasing the component input flow 1222 can provide for cooling of the gearbox 1250, thereby reducing the lubricant temperature sensed in the various lines 1204, 1206, 1212, 1214 as lubricant recirculates through the lubricant system 1200.

In another example, if a temperature difference between the sensing positions 1216, 1218 exceeds a predetermined threshold temperature difference, the bypass valve can automatically increase the component input flow 1222 by decreasing the bypass flow 1226. Such a predetermined threshold temperature difference can be any suitable operating temperature for the gearbox 1250, such as about 70° F., or differing by more than 30%, in some examples. In yet another example, if a temperature difference between the sensing positions 1216, 1218 is below the predetermined threshold temperature difference, the bypass valve can automatically decrease the component input flow 1222 or increase the bypass flow 1226. In this manner the lubricant system 1200 can provide for the gearbox to operate with a constant temperature difference between the supply and scavenge lines 1204, 1206.

This written description uses examples to disclose the technology, including the best mode, and also to enable any person skilled in the art to practice the disclosed technology, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. A turbomachine engine comprising a fan assembly including a plurality of fan blades, a vane assembly including a plurality of vanes, a core engine including one or more compressor sections and one or more turbine sections, a gearbox including an input and an output, and a gearbox efficiency rating of 0.10-1.8. The input is coupled to the one or more turbine sections of the core engine and comprises a first rotational speed, the output is coupled to the fan assembly and has a second rotational speed, and a gear ratio of the first rotational speed to the second rotational speed is within a range of 4.1-14.0. The gearbox efficiency rating equals $Q(D^{1.56}/T)^{1.53}$, where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.
2. The turbomachine engine of any clause herein, wherein the gearbox efficiency rating is 0.10-1.01.
3. The turbomachine engine of any clause herein, wherein the gearbox efficiency rating is 0.19-1.8
4. The turbomachine engine of any clause herein, wherein the gear ratio is within a range of 4.5-12.0.
5. The turbomachine engine of any clause herein, wherein the gear ratio is within a range of 6.0-11.0.
6. The turbomachine engine of any clause herein, wherein Q is within a range of 5-55 gallons per minute.
7. The turbomachine engine of any clause herein, wherein Q is within a range of 6-36 gallons per minute.
8. The turbomachine engine of any clause herein, wherein D is 120-216 inches.
9. The turbomachine engine of any clause herein, wherein D is 120-192 inches.
10. The turbomachine engine of any clause herein, wherein T is within a range of 10,000-100,000 pounds force.
11. The turbomachine engine of any clause herein, wherein T is within a range of 12,000-30,000 pounds force.
12. The turbomachine engine of any clause herein, wherein the gearbox is an epicyclic gearbox comprising a sun gear, a plurality of planet gears, and a ring gear, wherein the sun gear is the input, and wherein the ring gear is the output.
13. The turbomachine engine of any clause herein, wherein the gearbox is an epicyclic gearbox comprising a sun gear, a plurality of planet gears, and a ring gear, wherein the sun gear is the input, wherein the planet gears are coupled to a planet carrier, and wherein the planet carrier is the output.
14. The turbomachine engine of any clause herein, wherein the gearbox is a multi-stage gearbox.
15. The turbomachine engine of any clause herein, wherein the gearbox is a two-stage gearbox.
16. The turbomachine engine of any clause herein, wherein the gearbox is a compound gearbox.
17. A turbomachine engine comprising a fan assembly including a plurality of fan blades, a vane assembly including a plurality of vanes, a core engine including a low-pressure compressor, a high-pressure compressor, a combustor, a high-pressure turbine, and a low-pressure turbine, a gearbox including an input and an output, and a gearbox efficiency rating of 0.12-1.8. The input is coupled to the low-pressure turbine and comprises a first rotational speed, the output is coupled to the fan assembly and has a second rotational speed, and a gear ratio of the first rotational speed to the second rotational speed is within a range of 4.5-14.0. The gearbox efficiency rating equals Q(D^1.56/T)^1.53, where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.

18. The turbomachine engine of any clause herein, wherein Q is within a range of 5-55 gallons per minute.
19. The turbomachine engine of any clause herein, wherein D is 120-216 inches.
20. The turbomachine engine of any clause herein, wherein T is within a range of 10,000-100,000 pounds force.
21. The turbomachine engine of any clause herein, wherein the gearbox is an epicyclic gearbox comprising a star gear configuration.
22. The turbomachine engine of any clause herein, wherein the gearbox is an epicyclic gearbox comprising a planet gear configuration.
23. The turbomachine engine of any clause herein, wherein the fan assembly comprises 8-20 fan blades.
24. The turbomachine engine of any clause herein, wherein the low-pressure compressor comprises 1-8 stages.
25. The turbomachine engine of any clause herein, wherein the high-pressure compressor comprises 8-15 stages.
26. The turbomachine engine of any clause herein, wherein the high-pressure turbine comprises 1-2 stages.
27. The turbomachine engine of any clause herein, wherein the low-pressure turbine comprises 3-7 stages.
28. The turbomachine engine of any clause herein, wherein the low-pressure turbine is a counter-rotating low-pressure turbine comprising inner blade stages and outer blade stages, wherein the inner blade stages extend radially outwardly from an inner shaft, and wherein the outer blade stages extend radially inwardly from an outer drum.
29. The turbomachine engine of any clause herein, wherein the counter-rotating low-pressure turbine comprises four inner blade stages and three outer blade stages.
30. The turbomachine engine of any clause herein, wherein the counter-rotating low-pressure turbine comprises three inner blade stages and three outer blade stages.
31. A turbomachine engine comprising a fan assembly including a plurality of fan blades, a vane assembly including a plurality of vanes, a core engine including a low-pressure compressor, a high-pressure compressor, a combustor, a high-pressure turbine, and a low-pressure turbine. The turbomachine engine also includes a gearbox having a gear ratio within a range of 6.0-12.0, and a gearbox efficiency rating of 0.18-1.41.
32. The turbomachine engine of any clause herein, wherein a gearbox oil flow rate at an inlet of the gearbox is within a range of 5-55 gallons per minute at a max takeoff condition.
33. The turbomachine engine of any clause herein, wherein a diameter of the fan blades is 120-216 inches.
34. The turbomachine engine of any clause herein, wherein a net thrust of the turbomachine engine is within a range of 10,000-100,000 pounds force at a max takeoff condition.
35. A turbomachine engine comprises an unducted fan assembly, a core engine, a vane assembly, a gearbox, and a gearbox efficiency rating. The unducted fan assembly includes a single row of fan blades. The core engine including one or more compressor sections and one or more turbine sections. The vane assembly includes a single row of vanes. The vanes are disposed aft of the fan blades and comprise fixed end portions and free end portions. The fixed end portions are coupled to the core engine, and the free end portions are spaced radially outwardly from the core engine. The gearbox includes an input and an output. The input is coupled to the one or more turbine sections of the core engine and comprises a first rotational speed, the output is coupled to the unducted fan assembly and has a second rotational speed, and a gear ratio of the first rotational speed to the second rotational speed is within a range of 4.1-14.0. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.

36. The turbomachine engine of any clause herein, further comprising a pitch change mechanism coupled to the unducted fan assembly.
37. The turbomachine engine of any clause herein, further comprising a pitch change mechanism coupled to the vane assembly.
38. The turbomachine engine of any clause herein, wherein the gearbox efficiency rating is 0.25-1.15.
39. The turbomachine engine of any clause herein, wherein the gear ratio is within a range of 4.5-12.0.
40. The turbomachine engine of any clause herein, wherein the gear ratio is within a range of 6.0-11.0.
41. The turbomachine engine of any clause herein, wherein Q is within a range of 5-55 gallons per minute.
42. The turbomachine engine of any clause herein, wherein D is 120-216 inches.
43. The turbomachine engine of any clause herein, wherein T is within a range of 10,000-100,000 pounds force.
44. The turbomachine engine of any clause herein, wherein the gearbox is an epicyclic gearbox comprising a sun gear, a plurality of planet gears, and a ring gear, wherein the sun gear is the input, and wherein the ring gear is the output.
45. The turbomachine engine of any clause herein, wherein the gearbox is an epicyclic gearbox comprising a sun gear, a plurality of planet gears, and a ring gear, wherein the sun gear is the input, wherein the planet gears are coupled to a planet carrier, and wherein the planet carrier is the output.
46. The turbomachine engine of any clause herein, wherein the gearbox is a multi-stage gearbox.

47. The turbomachine engine of any clause herein, wherein the gearbox is a compound gearbox.

48. A turbomachine engine comprises an unducted fan assembly, an unducted vane assembly, a ducted fan assembly, a core engine, a gearbox, and a gearbox efficiency rating. The unducted fan assembly includes a plurality of first fan blades. The unducted vane assembly including a plurality of vanes, and the vanes are positioned aft of the first fan blades. The ducted fan assembly includes a plurality of second fan blades, and the ducted fan assembly is positioned aft of the unducted fan assembly and radially inwardly from the unducted vane assembly. The core engine including a low-pressure compressor, a high-pressure compressor, a combustor, a high-pressure turbine, and a low-pressure turbine. The gearbox is coupled to the low-pressure turbine and the unducted fan assembly. The gearbox comprises a gear ratio of 4.1-14.0 and is configured such that the unducted fan assembly rotates slower than low-pressure turbine. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.

49. The turbomachine engine of any clause herein, wherein the gearbox efficiency rating is 0.10-1.01.

50. The turbomachine engine of any clause herein, wherein the gearbox efficiency rating is 0.19-1.8.

51. The turbomachine engine of any clause herein, wherein Q is within a range of 5-40 gallons per minute.

52. The turbomachine engine of any clause herein, wherein D is 140-192 inches.

53. The turbomachine engine of any clause herein, wherein T is within a range of 10,000-40,000 pounds force.

54. The turbomachine engine of any clause herein, wherein the gearbox is an epicyclic gearbox comprising a star gear configuration.

55. The turbomachine engine of any clause herein, wherein the gearbox is an epicyclic gearbox comprising a planet gear configuration.

56. The turbomachine engine of any clause herein, wherein the unducted fan assembly comprises 8-14 fan blades.

57. The turbomachine engine of any clause herein, wherein the low-pressure compressor comprises 1-2 stages.

58. The turbomachine engine of any clause herein, wherein the high-pressure compressor comprises 10-11 stages.

59. The turbomachine engine of any clause herein, wherein the high-pressure turbine comprises two stages.

60. The turbomachine engine of any clause herein, wherein the low-pressure turbine comprises 6-7 stages.

61. The turbomachine engine of any clause herein, wherein the low-pressure turbine is a counter-rotating low-pressure turbine comprising inner blade stages and outer blade stages, wherein the inner blade stages extend radially outwardly from an inner shaft, and wherein the outer blade stages extend radially inwardly from an outer drum.

62. The turbofan engine of any clause herein, wherein the unducted fan assembly is configured to direct a first portion of airflow to the unducted vane assembly and a second portion of airflow into an inlet duct and to the ducted fan assembly, and wherein the ducted fan assembly is configured to direct the second portion of airflow to a fan duct and to a core duct.

63. A turbomachine engine comprises an open rotor fan assembly, a core engine, a vane assembly, a gearbox, a gearbox efficiency rating. The open rotor fan assembly including a plurality of fan blades. The core engine including a low-pressure compressor, a high-pressure compressor, a combustor, a high-pressure turbine, and a low-pressure turbine. The vane assembly including a plurality of vanes extending radially outwardly from the core engine in a cantilever manner. The gearbox is coupled to the low-pressure turbine and the open rotor fan assembly. The gearbox comprises a gear ratio of 6.0-12.0 and is configured such that a first rotational speed of the open rotor fan assembly is less than a second rotational speed of the low-pressure turbine. The gearbox efficiency rating is 0.18-1.41.

64. The turbomachine engine of any clause herein, wherein a gearbox oil flow rate at an inlet of the gearbox is within a range of 6-36 gallons per minute at a max takeoff condition, wherein a diameter of the fan blades is 140-192 inches, and wherein a net thrust of the turbomachine engine is within a range of 12,000-30,000 pounds force at a max takeoff condition.

65. A turbomachine engine comprises a fan case, a fan assembly, a pitch change mechanism, a core engine, a vane assembly, a gearbox, and a gearbox efficiency rating. The fan assembly is disposed radially within the fan case and comprises a plurality of fan blades. The pitch change mechanism is coupled to the fan assembly and is configured to adjust a pitch of the fan blades. The core engine including a low-pressure turbine. The vane assembly includes a plurality of vanes. The vanes are disposed aft of the fan blades and are coupled to the core engine and the fan case. The gearbox is coupled to the low-pressure turbine and the fan assembly. The gearbox is configured such that a ratio of a first rotational speed of the low-pressure turbine to a second rotational speed of the fan assembly is within a range of 4.1-14.0. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.

66. The turbomachine engine of any clause herein, wherein the pitch change mechanism is a first pitch change mechanism, and wherein the turbomachine engine further comprises a second pitch change mechanism coupled to the vane assembly and configured to adjust a pitch of the vanes.

67. The turbomachine engine of any clause herein, wherein the gearbox efficiency rating is 0.25-1.5.
68. The turbomachine engine of any clause herein, wherein the ratio of the first rotational speed of the low-pressure turbine to the second rotational speed of the fan assembly is within a range of 4.5-12.0.
69. The turbomachine engine of any clause herein, wherein the ratio of the first rotational speed of the low-pressure turbine to the second rotational speed of the fan assembly is within a range of 6.0-11.0.
70. The turbomachine engine of any clause herein, wherein Q is within a range of 5-55 gallons per minute.
71. The turbomachine engine of any clause herein, wherein D is 120-216 inches.
72. The turbomachine engine of any clause herein, wherein T is within a range of 10,000-100,000 pounds force.
73. The turbomachine engine of any clause herein, wherein the gearbox is an epicyclic gearbox comprising a sun gear, a plurality of planet gears, and a ring gear, wherein the sun gear is coupled to the low-pressure turbine, and wherein the ring gear is coupled to the fan assembly.
74. The turbomachine engine of any clause herein, wherein the gearbox is an epicyclic gearbox comprising a sun gear, a plurality of planet gears, and a ring gear, wherein the sun gear is coupled to the low-pressure turbine, wherein the planet gears are coupled to a planet carrier, and wherein the planet carrier is coupled to the fan assembly.
75. The turbomachine engine of any clause herein, wherein the gearbox is a multi-stage gearbox.
76. The turbomachine engine of any clause herein, wherein the gearbox is a compound gearbox.
77. A turbomachine engine comprises a fan case, a fan assembly, a pitch change mechanism, a vane assembly, a core engine, a gearbox, and a gearbox efficiency rating. The fan assembly is housed within the fan case and comprising a plurality of fan blades. The pitch change mechanism is coupled to the fan assembly. The vane assembly is housed within the fan case and comprises a plurality of vanes. The core engine includes a low-pressure compressor, a high-pressure compressor, a combustor, a high-pressure turbine, and a low-pressure turbine. The gearbox is coupled to the low-pressure turbine and the fan assembly. The gearbox comprises a gear ratio of 4.1-14.0 and is configured such that the fan assembly rotates slower than one or more stages of the low-pressure turbine. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.
77. The turbomachine engine of any clause herein, wherein the gearbox efficiency rating is 0.10-1.01.
78. The turbomachine engine of any clause herein, wherein the gearbox efficiency rating is 0.19-1.8
79. The turbomachine engine of any clause herein, wherein Q is within a range of 6-36 gallons per minute.
80. The turbomachine engine of any clause herein, wherein D is 140-192 inches.
81. The turbomachine engine of any clause herein, wherein T is within a range of 10,000-40,000 pounds force.
82. The turbomachine engine of any clause herein, wherein the gearbox is an epicyclic gearbox comprising a star gear configuration.
83. The turbomachine engine of any clause herein, wherein the gearbox is an epicyclic gearbox comprising a planet gear configuration.
84. The turbomachine engine of any clause herein, wherein the fan assembly comprises 8-14 fan blades.
85. The turbomachine engine of any clause herein, wherein the low-pressure compressor comprises 1-2 stages.
86. The turbomachine engine of any clause herein, wherein the high-pressure compressor comprises 10-11 stages.
87. The turbomachine engine of any clause herein, wherein the high-pressure turbine comprises two stages.
88. The turbomachine engine of any clause herein, wherein the low-pressure turbine comprises 6-7 stages.
89. The turbomachine engine of any clause herein, wherein the low-pressure turbine is a counter-rotating low-pressure turbine comprising inner blade stages and outer blade stages, wherein the inner blade stages extend radially outwardly from an inner shaft, wherein the outer blade stages extend radially inwardly from an outer drum, and wherein the gearbox is configured such that the fan assembly rotates slower than the inner blade stages of the low-pressure turbine.
90. A turbomachine engine comprises a fan case, a fan assembly, a pitch change mechanism, a core engine, a vane assembly, a gearbox, and a gearbox efficiency rating. The fan assembly includes a plurality of fan blades. The pitch change mechanism is coupled to the fan assembly. The core engine includes a low-pressure compressor, a high-pressure compressor, a combustor, a high-pressure turbine, and a low-pressure turbine. The vane assembly includes a plurality of vanes. The gearbox is coupled to the low-pressure turbine and the fan assembly. The gearbox comprises a gear ratio of 6.0-12.0 and is configured such that a first rotational speed of the fan assembly is less than a second rotational speed of the low-pressure turbine. The gearbox efficiency rating of 0.18-1.41.
91. The turbomachine engine of any clause herein, wherein a gearbox oil flow rate at an inlet of the gearbox is within a range of 5-40 gallons per minute at a max takeoff condition, wherein a diameter of the fan blades is 140-192 inches, and wherein a net thrust of the turbomachine engine is within a range of 12,000-30,000 pounds force at a max takeoff condition.
92. A turbomachine engine comprises a fan case, a fan assembly, a vane assembly, a core engine, a gearbox, and a gearbox efficiency rating. The fan assembly comprises a plurality of fan blades. The vane assembly includes a plurality of vanes, and the vanes are disposed aft of the fan blades. The core engine includes a counter-rotating low-pressure turbine. The gearbox is coupled to the counter-rotating low-pressure turbine and the fan assembly. The gearbox is configured such that a ratio of a first rotational speed of the counter-rotating low-pressure turbine to a second rotational speed of the fan assembly is within a range of 4.1-14.0. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.
93. The turbomachine engine of any clause herein, wherein the gearbox efficiency rating is 0.25-1.15.
94. The turbomachine engine of any clause herein, wherein the ratio of the first rotational speed of the counter-rotating low-pressure turbine to the second rotational speed of the fan assembly is within a range of 4.5-12.0.
95. The turbomachine engine of any clause herein, wherein the ratio of the first rotational speed of the counter-rotating low-pressure turbine to the second rotational speed of the fan assembly is within a range of 6.0-11.0.
96. The turbomachine engine of any clause herein, wherein Q is within a range of 5-55 gallons per minute.
97. The turbomachine engine of any clause herein, wherein D is 120-216 inches.
98. The turbomachine engine of any clause herein, wherein T is within a range of 10,000-100,000 pounds force.
99. The turbomachine engine of any clause herein, wherein the counter-rotating low-pressure turbine includes an inner rotor and an outer drum, wherein the inner rotor comprises a plurality of inner blade stages, wherein the outer drum comprises a plurality of outer blade stages, and wherein the outer blade stages are disposed between adjacent inner blade stages.
100. The turbomachine engine of any clause herein, wherein the counter-rotating low-pressure turbine comprises exactly three inner blade stages and exactly three outer blade stages.
101. The turbomachine engine of any clause herein, wherein the counter-rotating low-pressure turbine comprises exactly four inner blade stages and exactly three outer blade stages.
102. The turbomachine engine of any clause herein, wherein the gearbox is an epicyclic gearbox comprising a sun gear, a plurality of planet gears, and a ring gear, wherein the sun gear is coupled to the inner rotor of the counter-rotating low-pressure turbine, and wherein the ring gear is coupled to outer drum of the counter-rotating low-pressure turbine and the fan assembly.
103. The turbomachine engine of any clause herein, wherein the gearbox is a multi-stage gearbox comprising a first stage and a second stage, wherein the first stage of the gearbox comprises a first-stage sun gear, a plurality of first-stage planet gears coupled to a first-stage planet carrier, and a first-stage ring gear, wherein the second stage of the gearbox comprises a second-stage sun gear, a plurality of second-stage planet gears coupled to a second-stage planet carrier, and a second-stage ring gear, wherein the first-stage sun gear is coupled to the inner rotor of the counter-rotating low-pressure turbine, and wherein second-stage sun gear is coupled to the outer drum of the counter-rotating low-pressure turbine.
104. The turbomachine engine of any clause herein, wherein the first stage of the gearbox comprises a star gear configuration, and wherein the second stage of the gearbox comprises a planet gear configuration.
105. The turbomachine engine of any clause herein, further comprising a pitch change mechanism coupled to the fan assembly and configured to adjust a pitch of the fan blades.
106. A turbomachine engine comprises a fan case, a fan assembly, a vane assembly, a core engine, a gearbox, and a gearbox efficiency rating. The fan assembly is housed within the fan case and comprises a plurality of fan blades. The vane assembly is housed within the fan case and comprises a plurality of vanes. The core engine includes a low-pressure compressor, a high-pressure compressor, a combustor, a high-pressure turbine, and a counter-rotating low-pressure turbine. The gearbox is coupled to the counter-rotating low-pressure turbine and the fan assembly. The gearbox comprises a gear ratio of 4.1-14.0 and is configured such that the fan assembly rotates slower than one or more stages of the counter-rotating low-pressure turbine. The gearbox efficiency rating is 0.10-1.8. The gearbox efficiency rating equals $$Q\left(\frac{D^{1.56}}{T}\right)^{1.53},$$

where Q is a gearbox oil flow rate at an inlet of the gearbox measured in gallons per minute at a max takeoff condition, D is a diameter of the fan blades measured in inches, and T is a net thrust of the turbomachine engine measured in pounds force at the max takeoff condition.
107. The turbomachine engine of any clause herein, wherein the gearbox is an epicyclic gearbox comprising a star gear configuration.
108. The turbomachine engine of any clause herein, wherein the gearbox comprises a first stage and a second stage, and wherein the fan assembly rotates slower than all stages of the counter-rotating low-pressure turbine.
109. The turbomachine engine of any clause herein, wherein the first stage of the gearbox comprises a star gear configuration, and wherein the second stage of the gearbox comprises a planet gear configuration.
110. The turbomachine engine of any clause herein, wherein the gearbox efficiency rating is 0.20-1.10.
111. The turbomachine engine of any clause herein, wherein the gearbox efficiency rating is 0.10-1.01.
112. The turbomachine engine of any clause herein, wherein the gearbox efficiency rating is 0.19-1.8.
113. The turbomachine engine of any clause herein, wherein Q is within a range of 6-36 gallons per minute.
114. The turbomachine engine of any clause herein, wherein D is 140-192 inches.
115. The turbomachine engine of any clause herein, wherein T is within a range of 10,000-40,000 pounds force.
116. The turbomachine engine of any clause herein, wherein the fan assembly comprises 8-14 fan blades.

117. The turbomachine engine of any clause herein, wherein the low-pressure compressor comprises 1-2 stages.
118. The turbomachine engine of any clause herein, wherein the high-pressure compressor comprises 10-11 stages.
119. The turbomachine engine of any clause herein, wherein the high-pressure turbine comprises two stages.
120. The turbomachine engine of any clause herein, wherein the counter-rotating low-pressure turbine comprises 6-7 stages.
121. The turbomachine engine of any clause herein, wherein the counter-rotating low-pressure turbine comprises inner blade stages and outer blade stages, wherein the inner blades stages are coupled to a first rotatable shaft, and wherein the outer blades stages are coupled to a second rotatable shaft.
122. The turbomachine engine of any clause herein, wherein the gearbox is located forward from the combustor.
123. The turbomachine engine of any clause herein, wherein the gearbox is located aft of the combustor.
124. A turbomachine engine comprises a ducted fan assembly, a pitch change mechanism, a core engine, a ducted vane assembly, a gearbox, and a gearbox efficiency rating. The ducted fan assembly includes a plurality of fan blades. The pitch change mechanism is coupled to the ducted fan assembly. The core engine includes a low-pressure compressor, a high-pressure compressor, a combustor, a high-pressure turbine, and a counter-rotating low-pressure turbine. The ducted vane assembly includes a plurality of vanes. The gearbox is coupled to the counter-rotating low-pressure turbine and the ducted fan assembly. The gearbox comprises a gear ratio of 6.0-12.0 and is configured such that a first rotational speed of the ducted fan assembly is less than a second rotational speed of one or more stages of the counter-rotating low-pressure turbine. The gearbox efficiency rating is 0.18-1.41 at a max takeoff condition.
125. The turbomachine engine of any clause herein, wherein a gearbox oil flow rate at an inlet of the gearbox is within a range of 6-36 gallons per minute at a max takeoff condition, wherein a diameter of the fan blades is 140-192 inches, and wherein a net thrust of the turbomachine engine is within a range of 12,000-30,000 pounds force at a max takeoff condition.
126. A turbomachine engine comprises a fan case, a fan assembly, a vane assembly, a core engine, a gearbox, and a gearbox efficiency rating. The fan assembly is disposed radially within the fan case and comprises a plurality of fan blades. The core engine includes a low-pressure turbine. The vane assembly includes a plurality of vanes, and the vanes are disposed aft of the fan blades and are coupled to the core engine and the fan case. The gearbox is coupled to the low-pressure turbine and the fan assembly, and the gearbox comprises a gear ratio within a range of 4.1-14.0. The gearbox efficiency rating is 0.10-1.8 at a max takeoff condition.
127. The turbomachine engine of any clause herein, wherein the gearbox efficiency rating is 0.25-1.15 at the max takeoff condition.
128. The turbomachine engine of any clause herein, wherein the gearbox efficiency rating is 0.10-1.01 at the max takeoff condition.
129. The turbomachine engine of any clause herein, wherein the gearbox efficiency rating is 0.19-1.8 at the max takeoff condition.
130. The turbomachine engine of any clause herein, wherein the gear ratio of the gearbox is within a range of 4.5-12.0.
131. The turbomachine engine of any clause herein, wherein the gear ratio of the gearbox is within a range of 6.0-11.0.
132. The turbomachine engine of any clause herein, wherein a gearbox oil flow rate at an inlet of the gearbox is within a range of 5-55 gallons per minute at the max takeoff condition.
133. The turbomachine engine of any clause herein, wherein a diameter of the fan blades is 72-216 inches.
134. The turbomachine engine of any clause herein, wherein a net thrust of the turbomachine engine is within a range of 10,000-100,000 pounds force at the max takeoff condition.
135. The turbomachine engine of any clause herein, wherein the gearbox is an epicyclic gearbox comprising a sun gear, a plurality of planet gears, and a ring gear, wherein the sun gear is coupled to the low-pressure turbine, and wherein the ring gear is coupled to the fan assembly.
136. The turbomachine engine of any clause herein, wherein the gearbox is an epicyclic gearbox comprising a sun gear, a plurality of planet gears, and a ring gear, wherein the sun gear is coupled to the low-pressure turbine, wherein the planet gears are coupled to a planet carrier, and wherein the planet carrier is coupled to the fan assembly.
137. The turbomachine engine of any clause herein, wherein the gearbox is a multi-stage gearbox.
138. The turbomachine engine of any clause herein, wherein the gearbox comprises one or more compound gears, wherein each compound gear includes a first portion having a first diameter and a second portion having a second diameter, the second diameter being less than the first diameter.
139. The turbomachine engine of any clause herein, further comprising one or more pitch change mechanisms coupled to the fan assembly or the vane assembly.
140. A turbomachine engine comprises a fan case, a fan assembly, a vane assembly, a core engine, a gearbox, and a gearbox efficiency rating. The fan assembly is housed within the fan case and comprising a plurality of fan blades. The vane assembly is housed within the fan case and comprising a plurality of vanes. The core engine includes a low-pressure compressor, a high-pressure compressor, a combustor, a high-pressure turbine, and a low-pressure turbine. The gearbox is coupled to the low-pressure turbine and the fan assembly. The gearbox comprises a gear ratio of 4.1-14.0 and is configured such that the fan assembly rotates slower than one or more stages of the low-pressure turbine. The gearbox efficiency rating of 0.10-1.8 at a max takeoff condition.
141. The turbomachine engine of any clause herein, wherein the gearbox efficiency rating is 0.20-1.15 at the max takeoff condition.
142. The turbomachine engine of any clause herein, wherein a gearbox oil flow rate at an inlet of the gearbox is within a range of 6-36 gallons per minute at the max takeoff condition.

143. The turbomachine engine of any clause herein, wherein the fan blades comprise a diameter within a range of 72-120 inches.

144. The turbomachine engine of any clause herein, wherein a net thrust of the turbomachine engine is within a range of 10,000-40,000 pounds force at the max takeoff condition.

145. The turbomachine engine of any clause herein, wherein the gearbox is an epicyclic gearbox comprising a star gear configuration.

146. The turbomachine engine of any clause herein, wherein the gearbox is an epicyclic gearbox comprising a planet gear configuration.

147. The turbomachine engine of any clause herein, wherein the fan assembly comprises 8-20 fan blades.

148. The turbomachine engine of any clause herein, wherein the low-pressure compressor comprises 3-8 stages.

149. The turbomachine engine of any clause herein, wherein the high-pressure compressor comprises 8-15 stages.

150. The turbomachine engine of any clause herein, wherein the high-pressure turbine comprises 1-2 stages.

151. The turbomachine engine of any clause herein, wherein the low-pressure turbine comprises 3-6 stages.

152. The turbomachine engine of any clause herein, wherein the low-pressure turbine is a counter-rotating low-pressure turbine.

153. A turbomachine engine comprises a fan case, a fan assembly, a vane assembly, a core engine, an epicyclic gearbox, and a gearbox efficiency rating. The fan assembly is housed within the fan case and comprises 16-20 fan blades. The vane assembly is housed within the fan case and comprises a plurality of vanes. The core engine includes a low-pressure compressor, a high-pressure compressor, a combustor, a high-pressure turbine, and a low-pressure turbine. The low-pressure compressor comprises 2-4 stages, the high-pressure compressor comprises 8-10 stages, the high-pressure turbine comprises two stages, and the low-pressure turbine comprises 3-4 stages. The epicyclic gearbox is coupled to the low-pressure turbine and the fan assembly. The epicyclic gearbox comprises a gear ratio of 4.1-14.0 and is configured such that the fan assembly rotates slower than one or more stages of the low-pressure turbine. The gearbox efficiency rating is 0.10-1.8 at a max takeoff condition.

154. The turbomachine engine of any clause herein, wherein the gearbox efficiency rating is 0.25-0.55 at the max takeoff condition.

155. The turbomachine engine of any clause herein, wherein the gear ratio of the epicyclic gearbox is within a range of 6.0-12.0.

156. The turbomachine engine of any clause herein, wherein a gearbox oil flow rate at an inlet of the epicyclic gearbox is within a range of 5-40 gallons per minute at the max takeoff condition.

157. The turbomachine engine of any clause herein, wherein a diameter of the fan blades is 72-120 inches.

158. The turbomachine engine of any clause herein, wherein a net thrust of the turbomachine engine is within a range of 10,000-40,000 pounds force at the max takeoff condition.

159. The turbomachine engine of any clause herein, wherein the epicyclic gearbox comprises a sun gear, a plurality of planet gears, and a ring gear, wherein the sun gear is coupled to the low-pressure turbine, and wherein the ring gear is coupled to the fan assembly.

160. The turbomachine engine of any clause herein, wherein the epicyclic gearbox comprises a sun gear, a plurality of planet gears, and a ring gear, wherein the sun gear is coupled to the low-pressure turbine, wherein the planet gears are coupled to a planet carrier, and wherein the planet carrier is coupled to the fan assembly.

161. The turbomachine engine of any clause herein, wherein the epicyclic gearbox is a multi-stage gearbox.

162. The turbomachine engine of any clause herein, further comprising one or more pitch change mechanisms coupled to the fan assembly or the vane assembly.

163. The turbomachine engine of any clause herein, wherein the gearbox is a high power gearbox.

The invention claimed is:

1. A turbomachine engine comprising:
a fan assembly disposed radially within a fan case, wherein the fan assembly comprises a plurality of fan blades, and wherein a diameter of the fan blades is 72-216 inches;
a core engine including a low-pressure turbine;
a vane assembly including a plurality of vanes, wherein the vanes are disposed aft of the fan blades and are coupled to the core engine and the fan case; and
a gearbox coupled to the low-pressure turbine and the fan assembly, wherein the gearbox comprises a gear ratio within a range of 4.1-11.0 and a gearbox oil flow rate at an inlet of the gearbox within a range of 5-25 gallons per minute at a max takeoff condition.

2. The turbomachine engine of claim 1, further comprising a gearbox efficiency rating within a range of 0.10-1.24 at the max takeoff condition.

3. The turbomachine engine of claim 2, wherein the gearbox efficiency rating is within a range of 0.25-1.15 at the max takeoff condition.

4. The turbomachine engine of claim 2, wherein the gearbox efficiency rating is within a range of 0.10-1.01 at the max takeoff condition.

5. The turbomachine engine of claim 2, wherein the gearbox efficiency rating is within a range of 0.19-1.24 at the max takeoff condition.

6. The turbomachine engine of claim 1, wherein the gear ratio of the gearbox is within a range of 4.5-11.0.

7. The turbomachine engine of claim 1, wherein the gear ratio of the gearbox is within a range of 6-11.

8. The turbomachine engine of claim 1, wherein the gearbox oil flow rate at the inlet of the gearbox is within a range of 10-20 gallons per minute at the max takeoff condition.

9. The turbomachine engine of claim 1, wherein a net thrust of the turbomachine engine is within a range of 12,500-25,500 pounds force at the max takeoff condition.

10. The turbomachine engine of claim 1, wherein the gearbox is an epicyclic gearbox comprising a sun gear, a plurality of planet gears, and a ring gear, wherein the sun gear is coupled to the low-pressure turbine, and wherein the ring gear is coupled to the fan assembly.

11. The turbomachine engine of claim 1, wherein the gearbox is an epicyclic gearbox comprising a sun gear, a plurality of planet gears, and a ring gear, wherein the sun gear is fixedly coupled to the low-pressure turbine, wherein the planet gears are rotatably coupled to a planet carrier, and wherein the planet carrier is fixedly coupled to the fan assembly.

12. The turbomachine engine of claim 1, wherein the gearbox is a multi-stage gearbox.

13. The turbomachine engine of claim 1, wherein the gearbox comprises one or more compound gears, wherein each compound gear includes a first portion having a first diameter and a second portion having a second diameter, the second diameter being less than the first diameter.

14. A turbomachine engine comprising:
a fan case;
a fan assembly housed within the fan case and comprising 16-20 fan blades;
a vane assembly housed within the fan case aft of the fan assembly and comprising a plurality of vanes;
a core engine comprising a low-pressure compressor comprising 2-4 stages, a high-pressure compressor comprising 8-10 stages, a high-pressure turbine comprising two stages, and a low-pressure turbine comprising 3-4 stages; and
an epicyclic gearbox coupled to the low-pressure turbine and the fan assembly and comprising a gear ratio of 4.1-10 configured such that the fan assembly rotates slower than one or more stages of the low-pressure turbine, wherein the epicyclic gearbox comprises a gearbox oil flow rate at an inlet of the epicyclic gearbox is 5-20 gallons per minute at a max takeoff condition.

15. The turbomachine engine of claim 14, further comprising a gearbox efficiency rating of 0.10-1.1 at the max takeoff condition.

16. The turbomachine engine of claim 15, wherein the gearbox efficiency rating is 0.25-0.55 at the max takeoff condition.

17. The turbomachine engine of claim 14, wherein a diameter of the fan blades is 72-120 inches.

18. A turbomachine engine comprising:
a fan assembly disposed radially within a fan case, wherein the fan assembly comprises a plurality of fan blades;
a core engine including a low-pressure turbine;
a vane assembly including a plurality of vanes, wherein the vanes are disposed aft of the fan blades and are coupled to the core engine and the fan case; and
a gearbox coupled to the low-pressure turbine and the fan assembly, wherein the gearbox comprises a gear ratio within a range of 4.1-11.0 and a gearbox oil flow rate at an inlet of the gearbox within a range of 5-25 gallons per minute at a max takeoff condition,
wherein a net thrust of the turbomachine engine is within a range of 12,500-25,500 pounds force at the max takeoff condition.

19. The turbomachine engine of claim 18, further comprising a gearbox efficiency rating within a range of 0.10-1.24 at the max takeoff condition.

20. The turbomachine engine of claim 19, wherein the gearbox efficiency rating is within a range of 0.25-1.15 at the max takeoff condition.

* * * * *